(12) United States Patent
Treiser

(10) Patent No.: US 8,478,702 B1
(45) Date of Patent: Jul. 2, 2013

(54) TOOLS AND METHODS FOR DETERMINING SEMANTIC RELATIONSHIP INDEXES

(71) Applicant: Adam Treiser, North Brunswick, NJ (US)

(72) Inventor: Adam Treiser, North Brunswick, NJ (US)

(*) Notice: Subject to any disclaimer, the term of this patent is extended or adjusted under 35 U.S.C. 154(b) by 0 days.

(21) Appl. No.: 13/621,717

(22) Filed: Sep. 17, 2012

Related U.S. Application Data

(63) Continuation-in-part of application No. 13/461,670, filed on May 1, 2012, now Pat. No. 8,341,101.

(60) Provisional application No. 61/633,246, filed on Feb. 8, 2012.

(51) Int. Cl.
*G06F 15/18* (2006.01)

(52) U.S. Cl.
USPC .......................................................... 706/12

(58) Field of Classification Search
None
See application file for complete search history.

(56) References Cited

U.S. PATENT DOCUMENTS

| | | | |
|---|---|---|---|
| 5,710,884 A | 1/1998 | Dedrick | |
| 5,754,938 A | 5/1998 | Herz et al. | |
| 6,510,420 B1 | 1/2003 | Cessna et al. | |
| 6,778,982 B1 | 8/2004 | Knight et al. | |
| 6,990,486 B2 | 1/2006 | Ma et al. | |
| 7,035,855 B1 | 4/2006 | Kilger et al. | |
| 7,117,192 B2 | 10/2006 | Waltz et al. | |
| 7,177,864 B2 | 2/2007 | Ekhaus | |
| 7,365,308 B2 | 4/2008 | Trcka et al. | |
| 7,403,910 B1 | 7/2008 | Hastings et al. | |
| 7,406,434 B1 | 7/2008 | Chang et al. | |
| 7,454,412 B2 | 11/2008 | Diewald et al. | |
| 7,546,278 B2 | 6/2009 | Yang et al. | |
| 7,949,565 B1 | 5/2011 | Eldering et al. | |
| 7,970,712 B2 | 6/2011 | Ruvolo et al. | |
| 8,010,460 B2 | 8/2011 | Work et al. | |
| 8,010,570 B2 | 8/2011 | Sweeney | |
| 8,027,864 B2 | 9/2011 | Gilbert | |

(Continued)

FOREIGN PATENT DOCUMENTS

WO WO2007134128 11/2007

OTHER PUBLICATIONS

Kai-Yu Wang, I-Hsien Ting, and Hui-Ju Wu, *Discovering Interest Groups for Marketing in Virtual Communities*, J Bus Res (2012)—7 pages.

(Continued)

*Primary Examiner* — Kakali Chaki
*Assistant Examiner* — Peter Coughlan
(74) *Attorney, Agent, or Firm* — Finnegan, Henderson, Farabow, Garrett & Dunner, L.L.P.

(57) ABSTRACT

Systems, apparatuses, and methods for determining an individual's sentimental baseline, based on a plurality of data items and characteristics. The data items may include objective and quantitative data, as well as subjective and qualitative data. The system, apparatus, or method may obtain a number of relationships between information atoms, identify sentiments associated with the relationships, and calculate sentimental baselines for those relationships. Differences from any baseline may also be calculated, to determine true changes in sentiment. Relationships between those differences and other data or relationships may also be calculated, to determine how a change in sentiment is related to other changes in behavior. For example, relationships between a particular difference and changes in any metric, sub-metric, group of characteristics, data item, data source, characteristic, sentiment, or groups thereof may be determined. These relationships may also be used to predict future behavior or sentiment.

30 Claims, 18 Drawing Sheets

U.S. PATENT DOCUMENTS

| | | | |
|---|---|---|---|
| 8,036,930 | B2 | 10/2011 | Brignull et al. |
| 8,046,797 | B2 | 10/2011 | Bentolila et al. |
| 8,082,291 | B2 | 12/2011 | Gisolfi et al. |
| 8,112,420 | B2 * | 2/2012 | Yamamoto et al. ........... 707/736 |
| 2003/0033194 | A1 | 2/2003 | Ferguson et al. |
| 2004/0122681 | A1 | 6/2004 | Ruvolo et al. |
| 2004/0215500 | A1 | 10/2004 | Monahan |
| 2006/0042483 | A1 | 3/2006 | Work et al. |
| 2006/0074832 | A1 | 4/2006 | Gardner et al. |
| 2006/0248087 | A1 | 11/2006 | Agrawal et al. |
| 2007/0011183 | A1 | 1/2007 | Langseth et al. |
| 2007/0239517 | A1 | 10/2007 | Chung et al. |
| 2007/0299910 | A1 * | 12/2007 | Fontenot et al. ............. 709/204 |
| 2008/1016257 | | 7/2008 | Gilbert |
| 2009/0006286 | A1 | 1/2009 | Angell et al. |
| 2009/0177644 | A1 * | 7/2009 | Martinez et al. ................. 707/5 |
| 2009/0216563 | A1 | 8/2009 | Sandoval et al. |
| 2009/0300326 | A1 | 12/2009 | Sweeney |
| 2010/0070448 | A1 | 3/2010 | Omoigui |
| 2010/0094858 | A1 | 4/2010 | Indeck et al. |
| 2010/0114899 | A1 | 5/2010 | Guha et al. |
| 2010/0153453 | A1 | 6/2010 | Knowles |
| 2010/0179845 | A1 | 7/2010 | Davidson |
| 2011/0015969 | A1 | 1/2011 | Loeb |
| 2011/0153377 | A1 | 6/2011 | Novikov et al. |
| 2011/0213741 | A1 | 9/2011 | Shana et al. |
| 2011/0295694 | A1 | 12/2011 | Coggeshall et al. |
| 2012/0185353 | A1 | 7/2012 | Goel |

OTHER PUBLICATIONS

Cindy K.Chung et al., *Revealing Dimensions of Thinking in Open-Ended Self Descriptions: an Automated Meaning Extraction Method for Natural Language*, 42 J. Research & Personality 96-132 (2008)—37 pages.

Eric Gilbert and Karrie Karahalios, *Predicting Tie Strengths With Social Media*, ACM CHI '09 Proceedings of the 27th international conference on Human factors in computing systems (2009)—10 pages.

Tom DuBois, et al., *Improving Recommendation Accuracy by Clustering Social Networks with Trust*, 3rd ACM Conference on Recommender Systems workshop: Recommender Systems and the Social Web.,(2009)—7 pages.

J. Goldbeck et al., "Predicting Personality with Social Media," Submitted for Review to CHI (2011)—10 pages.

Paul Gillan, "The New Conversation: Taking Social Media from Talk to Action," *Harvard Business Review* (2010)—24 pages.

Jim Sterne, "Text Analytics for Social Media—Evolving Tools for an Evolving Environment," *White Paper* (2010)—17 pages.

Search BusinessAnalytics.com Tip Guide: 'Big Data' Finds Ally in Predictive Analytic, but Combo Requires Care, *TechTarget Business Applications and Analytics Media*—7 pages.

Sarah Perez, "How Twitter Is Pairing Its Interest Graph With Ads," *TechCrunch* (2012)—2 pages.

Michael Chui et al., "The Impact of Big Data on Payments," 2012—7 pages.

Mark R. Gilbert et al. "Planning for 2012: Uncover Synergies from ECM and BI Investments," *Gartner, Inc.*, ID:G002176645 (2011)—5 pages.

Y. Bachrach et al., "Personality and Patterns of Facebook Usage", *WebSci 2012*, Jun. 22-24, 2012 (9 pages).

Facebook F8: Redesigning and hitting 800 million users, *LA Times*, Sep. 2011 (3 pages).

Y. Amichai-Hamburger and G. Vinitzky, "Social Network Use and Personality," *Computers in Human Behavior*, 26-1289-1295, 2010 (7 pages).

M.R. Barrick and M. K. Mount, "The Big Five Personality Dimensions and Job Performance: A Meta-Analysis," *Personnel Psychology*, 44(1):1-26, 1991 (26 pages).

C.M. Bishop, "Pattern Recognition and Machine Learning", vol. 4, Springer New York, 2008 (19 pages).

D. Byrne, W. Griffitt, and D. Stefaniak, "Attraction and Similarity of Personality Characteristics," *Journal of Personality and Social Psychology*, 5(1):82-90, 1967 (9 pages).

T. Correa, A, W. Hinsley, and H. G. De Zuniga, "Who Interacts on the Web?: The Intersection of Users' Personality and Social Media Use," *Computers in Human Behavior*, 26:247-253, 2009 (7 pages).

P. T. Costa Jr. and R. R. McCrae, "NEO Personality Inventory-Revised (NEO-PI-R) and NEO Five-Factor Inventory (NEO-FFI) Professional Manual," *Odessa, FL.,: Psychological Assessment Resources*, 1992 (5 pages).

D.C. Evans, S.D. Gosling, and A. Carroll, "What Elements of an Online Social Networking Profile Predict Target-Rater Agreement in Personality Impressions," *In Proceedings of the International Conference on Weblogs and Social Media*, pp. 1-6, 2008 (6 pages).

A. Finder, "When a RisquéOnline Persona Undermines a Chance for a Job," New York Times, Jun. 11, 2006 (2 pages).

L.R. Goldberg, "The Structure of Phenotypic Personality Traits," *American Psychologist*, 48(1):26-34, 1993 (9 pages).

L.R. Goldberg, "A Broad-Bandwidth, Public Domain, Personality Inventory Measuring the Lower-Level Facets of Several Five-Factor Models," *Personality Psychology in Europe*, 7:7-28; 1999 (22 pages).

L.R. Goldberg, J.A. Johnson, H.W. Eber, R. Hogan, M.C. Ashton, C.R. Cloninger, and H.G. Gough, The International Personality Item Pool and the Future of Public-Domain Personality Measures, *Journal of Research Personality*, 40:84-96, 2006 (available online 2005) 18 pages.

S.D. Gosling, A.A. Augustine, S. Vazire, N. Holtzman, and S. Gaddis. "Manifestation of Personality in Online Social Networks: Self-reported Facebook-related Behaviors and Observable Profile Information," *Cyberpsychology, Behavior, and Social Networking*, 14(9):483-488, 2011 (6 pages).

S.D. Gosling, S. Gaddis, and S. Vazire, "Personality Impressions Based on Facebook Profiles," *ICWSM*, 2007 (4 pages).

G. Holmes, A. Donkin, and I.H. Witten, "WEKA: A Machine Learning Workbench," *Intelligent Information Systems, 1994, Proceedings of the 1994 Second Australian and New Zealand Conference on*, IEEE, pp. 357-361, 1994 (5 pages).

T.A. Judge, C.A. Higgins, C.J. Thoresen, and M.R. Barrick, "The Big Five Personality Traits, General Mental Ability, and Career Success Across the Life Span," *Personnel Psychology*, 52(3):621-652, 1999 (32 pages).

E.L. Kelly and J.J. Conley, "Personality and Compatibility: A Prospective Analysis of Marital Stability and Martial Satisfaction," *Journal of Personality and Social Psychology*, 52(1):27-40, 1987 (14 pages).

D.J. Ozer and V. Benet-Martinez, "Personality and the Prediction of Consequential Outcomes," *Annu. Rev. Psychol.*, 57:401-421, 2006 (available online 2005) 23 pages.

PCT International Search Report and Written Opinion of PCT Application No. PCT/US 2012/61642, dated Feb. 5, 2013 (17 pages).

PCT International Search Report and Written Opinion of PCT Application No. PCT/US 2013/24119, dated Apr. 8, 2013 (19 pages).

PCT International Search Report and Written Opinion of PCT Application No. PCT/US 2013/025070, dated Apr. 15, 2013 (11 pages).

PCT International Search Report and Written Opinion of PCT Application No. PCT/US 2013/025128, dated Apr. 16, 2013 (13 pages).

C. Ross, E.S. Orr, M. Sisic, J.M. Arseneault, M.G. Simmering, and R. Robert Orr, "Personality and Motivations Associated with Facebook Use," *Computers in Human Behaviors*, 25:578-586, 2009 (9 pages).

M.T. Russell and D.L. Karol, "The 16PF Fifth Adminstrator's Manual," *Institute for Personality and Ability Testing Champaign, IL*, 1994 (10 pages).

T. Ryan and S. Xenos, "Who Uses Facebook? An Investigation into the Relationship Between the Big Five, Shyness, Narcissism, Loneliness, and Facebook Usage." *Computers in Human Behavior*, 24:1658-1664, 2011 (7 pages).

R.P. Tett, D.N. Jackson, and M. Rothstein, "Personality Measures as Predictors of Job Performance: A Meta-analytic Review," *Personnel Psychology*, 44:703-742, 1991 (40 pages).

E.C. Tupes and R.E. Christal, "Recurrent Personality Factors Based on Trait Ratings," *Journal of Personality*, 60(2):225-251, 1992 (released for publication in 1961) 28 pages.

S. Zhao, S. Grasmuck, and J. Martin, "Identity Construction on Facebook: Digital Empowerment in Anchored Relationships," Computers in Human Behavior, 24:1816-1836, 2008 (21 pages).

B. Zhong, M. Haroin, and T. Sun, "Less Effortful Thinking Leads to More Social Networking? The Association Between the Use of Social Network Sites and Personality Traits," *Computers in Human Behavior*, 27:1265-1271, 2011 (7 pages).

* cited by examiner

TOOLS AND METHODS FOR DETERMINING SEMANTIC RELATIONSHIP INDEXES

This application is a continuation-in-part of U.S. patent application Ser. No. 13/461,670, filed on May 1, 2012, which issued as U.S. Pat. No. 8,341,101 on Dec. 25, 2012. This application also claims priority to U.S. Provisional Application No. 61/633,246, filed on Feb. 8, 2012, titled "Tools and Methods for Determining Relationship Values," which is incorporated herein by reference in its entirety. This application also incorporates by reference U.S. patent application Ser. No. 13/492,528 in its entirety.

BACKGROUND

1. Technical Field

The present invention relates to characteristic-based profiling systems and, more particularly, to combining multiple points of data regarding individuals through the use of characteristics in order to determine the relationship between the individuals and a user-defined criteria.

2. Description of the Related Art

Customer profiling systems are known in the art. Traditional systems include consumer rewards cards, credit card purchase information, demographic profiling, behavioral profiling, and customer surveying. Some businesses supplement these traditional systems with website and social media analytic tools that profile the business's fans and followers according to factors such as "likes," "click-through rates," and search engine queries, among others. Generally, these systems attempt to determine products, promotions, and advertisements that are most likely to appeal to a specific customer or broad customer segment. This information helps businesses forecast future market behavior, manage their product portfolio and inventory levels, adjust product pricing, design marketing strategies, and determine human resource and capital investment needs in order to increase revenue, market share, and profitability. For example, advertising targeted at customers who are most likely to purchase a product may be more effective than advertising targeting broader audiences. Likewise, products that are related to one another are likely to be purchased by the same customer and may sell better if offered at the same time, whether as a package or as separate items. Online retailers often use a similar approach, suggesting items that other customers frequently purchase in conjunction with the selected item.

While most approaches create basic customer profiles, these profiles do not reflect the myriad similarities between customers or the numerous ways in which customers can be grouped. For example, most approaches generally provide profiles on either an individual customer or an overly broad customer segment (for example, all women ages 25-34 with a college degree), failing to reflect the various degrees of granularity with which customers can be grouped. One type of approach typically uses only historical, static, and quantitative or objective information. As a result, customer profiles created by these approaches are generally outdated and inaccurate, and fail to account for the vast amount of potentially rich, but qualitative and subjective, information about the customer that is available to most businesses. A second type of approach uses only subjective or qualitative information. These approaches also have drawbacks. Typically they use expensive and time-consuming methods such as customer surveys or focus groups. Due to the nature of the setting, the results may not accurately reflect the attitudes or opinions of the surveyed individuals. Due to the expense and time involved, only a limited number of individuals may be surveyed. Likewise, the purchasing suggestions created by these systems are often inaccurate. For example, while many customers who purchase item A also purchase item B, that information does not provide any insight into what a specific customer, or group of customers, may be interested in.

Additionally, customer information is often collected with respect to a single business metric and may never be used to glean insights about other metrics that may be helpful to the company. This is particularly true for businesses that are growing and those that have multiple departments. Growing businesses must usually adjust or supplement its performance metrics to reflect new goals, strategies, and business operations. As a result, these businesses must understand how its customers relate to the new set of business metrics rather than, or in addition to, the ones for which the data was originally collected. Similarly, businesses with multiple departments frequently gather customer information for purposes of a department-specific metric, but fail to use that information across other departments or globally within the organization. For example, a business may have a marketing department and risk management department. Customer information gathered by the marketing department when researching new product markets may never be seen or used by the risk management team to determine whether that customer or market poses undue risk to the business. Methods for combining this disparate data, (for example, a technique sometimes referred to as "one version of the truth analysis") do not allow the business to apply the same method to external data it may be interested in. Furthermore, these systems are used only to organize the information and are not useful for analyzing it.

For example, companies may gather information to attempt to measure the sentiment that individuals, or groups of individuals, express towards certain topics (for example, a specific product, brand, company, issue, or person). This may allow an organization to determine how people perceive it, or topics important to it.

Sentiment analysis methods are capable of identifying the sentiment expressed in a single statement, or the overall sentiment expressed by multiple statements; however, these methods typically cannot determine whether this sentiment accurately reflects the individual's (or group's) true feelings, or simply reflects the mannerisms and style of that individual or group. For example, a certain individual may generally express strong sentiments as part of their personal style, even when they do not feel strongly about the topic they are discussing. Sentiment analysis methods may incorrectly determine that this individual has a strong sentiment towards a given topic, based on the sentiment normally expressed by that individual. Thus, there is a need for a more accurate sentiment analysis method that takes into account the baseline sentiment expressed by each individual or group, to more accurately determine that individual's or group's sentiment towards a given topic.

In addition, sentiment analysis methods are unable to determine which individuals matter the most to an organization. For example, a business may wish to identify which customers have the most impact on a marketing campaign. Likewise, an organization may wish to identify individuals that have absolutely no significance to it whatsoever, and should therefore be ignored. These sentiment analysis methods may be able to identify which individuals have positive or negative sentiment about the campaign. However, these methods will not be able to determine which of those individuals are also the most important to that business. For example, an organization may wish to identify individuals who make statements that influence others. A positive or negative review by one individual (for example, a technology critic) may be taken more seriously, and influence more people, than a similar review by another individual. In other cases, the sentiment expressed by an individual may be a reliable predictor of larger trends, even if that individual's statement is not influential. For example, certain individuals may have insights that are later expressed by large groups, even if the group is unaware of that insight. Thus, an organization may wish to identify these insightful individuals, in order to determine trends and attitudes as early as possible.

Likewise, an organization may wish to know how a positive or negative sentiment expressed by an individual corresponds to certain behavior by that same individual. For example, whether an individual who makes a negative statement about a service later discontinues that service. This may allow the organization to determine which dissatisfied customers it should offer the largest incentives to continue their service. A business might also wish to know which individuals that make positive statements about a product later purchase that product. This may allow a business to identify which potential customers are most likely to make a purchase, in order to target those customers with incentives. A business may also want to identify people with similar sentimental patterns and characteristic based profiles so as to better understand how to address, prepare for, and anticipate various situations, changes in situations, relationships, customer feelings, reactions, or sentiments.

The organization may also wish to track the change in an individual's sentiment based on certain actions by the organization. For example, whether an incentive was effective in retaining a customer because it actually changed the customer's sentiment, or whether the customer has retained service because of the incentive, but remains dissatisfied. Or, whether a certain marketing campaign affects individuals' sentiment towards a product.

As a result, there is a need for a system that addresses the issues above.

SUMMARY

In the following description, certain aspects and embodiments of the present invention will become evident. It should be understood that the invention, in its broadest sense, could be practiced without having one or more features of these aspects and embodiments. It should also be understood that these aspects and embodiments are merely exemplary.

Consistent with an exemplary embodiment of the present invention, there is provided a computer-readable non-transitory storage medium having instructions which, when executed on a processor, perform a method for identifying relationships between individuals, metrics, and sub-metrics, using characteristics.

It is to be understood that both the foregoing general description and the following detailed description are exemplary and explanatory only, and are not restrictive of the invention, as claimed. Further features or variations may be provided in addition to those set forth herein. For example, the present invention may be directed to various combinations and sub-combinations of the disclosed features, or combinations and sub-combinations of several further features disclosed below in the detailed descriptions.

BRIEF DESCRIPTION OF THE DRAWINGS

The accompanying drawings, which are incorporated in and constitute a part of this specification, illustrate embodiments and together with the description, serve to explain the principles of the invention. In the drawings.

DETAILED DESCRIPTION OF EXEMPLARY EMBODIMENTS

Figure 1:
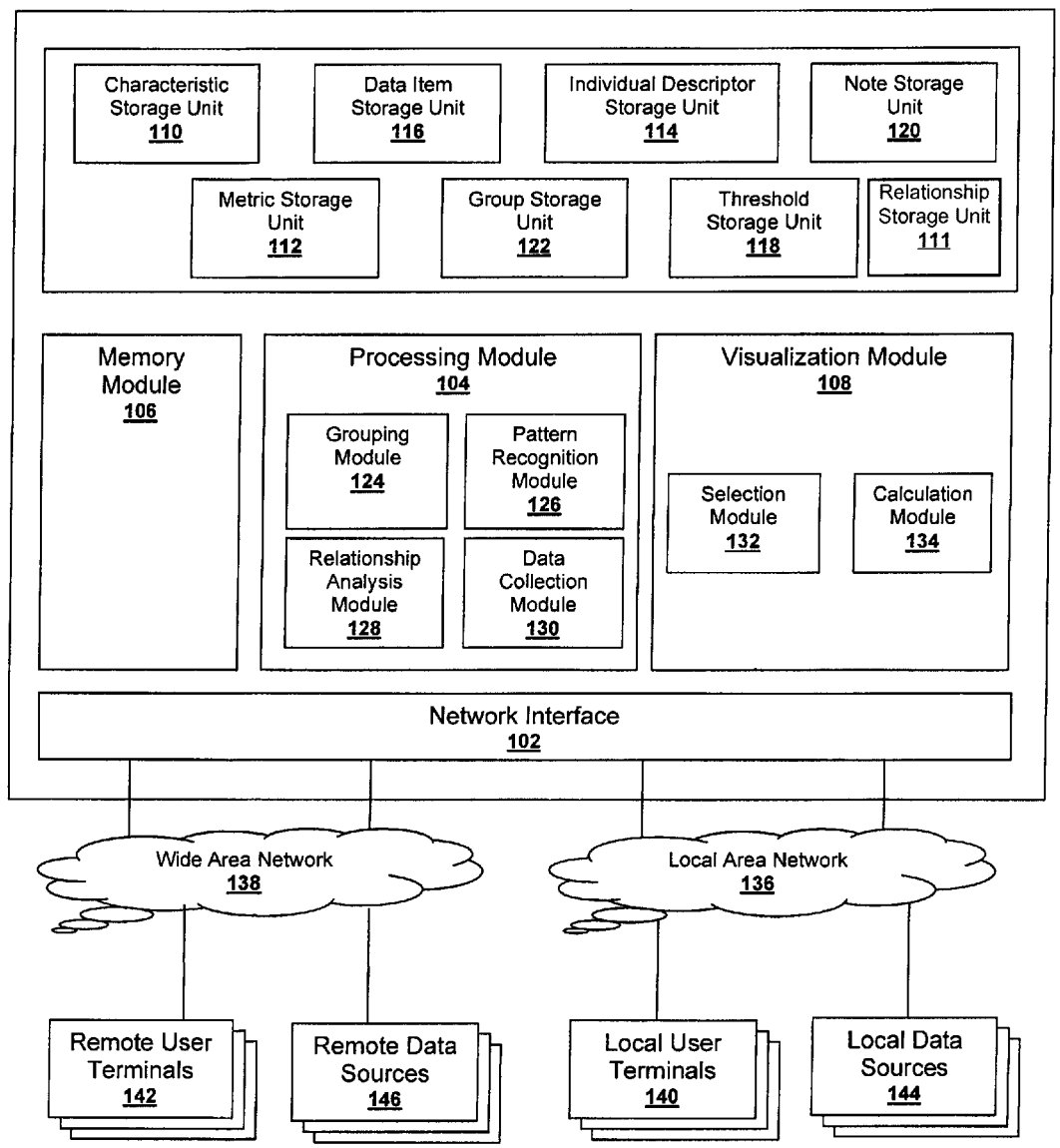
FIG. 1 is a block diagram of an exemplary embodiment of a characteristic-based server.

Reference will now be made in detail to an exemplary embodiment of the invention, an example of which is illustrated in the accompanying drawings. Wherever possible, the same reference numbers will be used throughout the drawings to refer to the same or like parts. It is apparent, however, that the embodiments shown in the accompanying drawings are not limiting, and that modifications may be made without departing from the spirit and scope of the invention.

Systems and methods consistent with the invention provide a characteristic-based system for identifying, organizing, describing, and visualizing relationships between a business's metrics and individuals. To this end, the characteristic-based system may define a number of characteristics. As used herein, the term characteristic broadly refers to any attribute, trait, value, or other factor associated, whether objectively or subjectively, with an individual or group of individuals. The detailed description below provides further examples of such characteristics. When receiving information about an individual, the characteristic-based system may use a suitable relationship-determining module (i.e., a software component, a hardware component, or a combination of a software component and a hardware component) comprising relationship-determining algorithms known in the art to determine the relationship between the information and the characteristics. This relationship may be described using both a magnitude and a direction. Further, the description may be represented by a numerical value, textual identifier, graphical icon, color, opacity, or any other suitable method of representing the relationship. The magnitude may represent how strongly the information is related to the characteristics, including the lack of any relationship at all. The relationship may also be identified as positive, negative, or neutral. The term "positive" broadly refers to relationships where the existence of, or a change in, one member of the relationship corresponds to a similar existence of, or a similar change in, the other members. The term "negative" broadly refers to relationships where the existence of, or a change in one member of the relationship corresponds to a lack of the existence of, or an inverse change in, the other members. The term "neutral" broadly refers to a relationship where the existence of, or a change in one member of the relationship does not correspond to any existence or change in the other members.

The system may also receive a plurality of descriptors, identifying or describing specific individuals. The system may use a similar relationship-determining module to identify which individual, or individuals, are the most strongly related to the information. Again, the relationships may include a magnitude, and/or a direction identified as positive, negative, or neutral. In this way, the system may further determine the relationship between the individuals and the characteristics. These relationships may be accumulated over time to develop a better understanding of the individual, based on multiple data points.

Further, the system may use the relationship-determining modules to identify new relationships and patterns in the data. The system may use these relationships and patterns to create new characteristics, which will be used when evaluating the received data. Likewise, over time the system may identify characteristics that generally do not relate to the data. It may flag these characteristics as irrelevant with respect to certain data or relationships. The system may then skip the irrelevant characteristics, increasing performance.

The system may also use the relationship-determining module to identify characteristics that are related to each other. The system may group these related characteristics together, as a group of characteristics. Any title may be given to this group of characteristics, or to the group of individuals, data, data sources, or metrics that have a strong relationship with that group of characteristics. The system may use the relationship-determining module to determine the relationships between the groups of characteristics and the characteristics, data, individuals, and the other groups of characteristics. In this manner, personality types may be identified and analyzed.

In addition, the system may receive a metric, representing an overall goal or interest of a particular organization. As used herein, the term metric broadly refers to any attribute, measurement, goal, strategy, or other information of interest to an organization. The metric may also consist of a number of sub-metrics. As used herein, the term sub-metric broadly refers to any attribute, measurement, goal, strategy, or other information related to the metric. The system may use a suitable relationship-determining module to identify the relationship between the metric and the characteristics. In this way, the system may further determine the relationship between the metrics and the individuals. The system may also determine the relationship between groups of characteristics and the metric, and individuals and the metric. In this manner, the organization may gain information on how personality types or individuals contribute to the metric it is interested in.

Further, a visualization module (i.e., a software component, a hardware component, or a combination of a software component and a hardware component) may be used to develop a representation of any relationship or group of relationships. The user may select two areas of interest. The selections may comprise one or more metrics, sub-metrics, characteristics, groups of characteristics, individuals, data items, data sources, or any grouping of the same. Once both selections have been made, the system may use the relationships for those selections to calculate an overall relationship between the two. The system may then represent this overall relationship as a single value or descriptor. Further, the user may assign weights to one or more of the selection items, or change the assigned weights. When the weights are changed, the system may re-calculate all relationships and values associated with the weights. The system may use these weights accordingly when calculating the overall relationship between the selections. The system may also determine the relationships between one selection and the underlying items comprising the other selection. The system may then compute a single value or descriptor for the underlying items. In this manner, the user is able to determine how the underlying items contribute to the overall relationship between the selections.

The system may also receive a plurality of threshold criteria. As used herein, the term threshold criteria broadly refers to any value, term, event, or descriptor related to one or more data items, data sources, individuals, characteristics, groups of characteristics, or relationships. The threshold criteria may represent a specific event, (e.g., an individual has changed their job description), a keyword (e.g., an advertising keyword was mentioned in a blog post), a value (e.g., a relationship is at, above, or below the criteria), a transaction (e.g., an individual has booked a flight), or any other criteria about which the organization wishes to be informed. The system may output notifications when any threshold criteria are met.

FIG. 1 is a block diagram of an exemplary embodiment of a characteristic-based server 100. One skilled in the art will appreciate that system 100 may be implemented in a number of different configurations without departing from the scope of the present invention. As shown in FIG. 1, characteristic-based system 100 may include a network interface 102, a memory module 106, a processing module 104, a visualization module 108, and one or more interconnected information storage units, such as, for example, a characteristic storage unit 110, a relationship storage unit 111, a metric storage unit 112, an individual descriptor storage unit 114, a data item storage unit 116, a threshold criteria storage unit 118, a note storage unit 120, and a group storage unit 122. While the information storage units in the embodiment shown in FIG. 1 are interconnected, each information storage unit need not be interconnected. Moreover, rather than separate storage units, characteristic-based server 100 may include only one database that would include the data of storage units 110-122. Likewise, while the data storage units are shown as part of server 100, in another embodiment, one or more storage units may be separate units, connected to server 100 through network interface 102.

Network interface 102 may be one or more devices used to facilitate the transfer of information between server 100 and external components, such as user terminals 140, 142 and data sources 144, 146. Network interface module 102 may receive user requests from local user terminal 140 or remote user terminal 142, and route those requests to processing module 104 or visualization module 108. In exemplary embodiments, network interface module 102 may be a wired or wireless interface to a local-area network connecting one or more local user terminals 142 and local data sources 144, or wide-area network such as the internet, connecting one or more remote user terminals 142, or remote data sources 146. Network interface module 102 may allow a plurality of local user terminals 140 and remote user terminals 142 to connect to the system, in order to make selections and receive information, alerts, and visualizations. Network interface module 102 may also allow the system to connect to one or more local data sources 144, on a local-area-network, or remote data sources 146, on one or more remote networks.

Memory module 106 may represent one or more non-transitory computer-readable storage devices that maintain information that is used by processing module 104 and/or other components internal and external to characteristic-based server 100. Further, memory module 106 may include one or more programs that, when executed by processing module 104, perform one or more processes consistent with embodiments of the present invention. Examples of such processes are described below with respect to FIGS. 1-21. Memory module 106 may also include configuration data that may be used by processing module 104 to present user interface screens and visualizations to user terminals 140 and 142. Examples of such screens are described in greater detail with respect to FIGS. 9-16.

Processing module 104, as shown in FIG. 1, may further include a data collection module 130, a grouping module 124, a pattern recognition module 126, and a relationship analysis module 128. Data collection module 130 may include components for collecting data items from data sources, using network interface 102. As described in more detail below, data items collected by the data collection module may include any information pertaining to an individual. Relationship analysis module 128 may include components for determining the existence and strength of a relationship between two items. For example, and as described in greater detail below, relationship analysis module 128 may include a natural-language processing component for determining the relationship between two items. Relationship analysis module 128 may also include a sentiment analysis component for determining a sentiment associated with the relationship. Grouping module 124 may include components for identifying groups of related items. For example, and as described in greater detail below, grouping module 124 may use relationships identified by relationship analysis module 128 to identify groups of related items. Pattern recognition module 126 may include components for identifying patterns in the received data. For example, and as described in greater detail below, pattern recognition module 126 may include pattern recognition algorithms known in the art to identify new characteristics based on patterns of received data.

As shown in FIG. 1, characteristic-based server 100 may also include a plurality of interconnected storage units, 110-122. In this regard, server 100 may include a storage unit module (not shown) having components for controlling access to storage units 110-122. Such a storage unit module may include a query function that, in response to a match request, may query information stored in one or more of storage units 110-122 to identify characteristics, data items, or metrics meeting specified criteria. Storage units 110-122 may be configured using any appropriate type of unit that facilitates the storage of data, as well as the locating, accessing, and retrieving of data stored in the storage units.

Characteristic storage unit 110 may store general characteristics of individuals. As used herein, the term characteristic broadly refers to any attribute, trait, value or other factor associated, whether objectively or subjectively, with an individual or group of individuals. For example, a characteristic may reflect a number of attributes that may be applicable to one or more individuals, such as types of previously or currently held fields of work (e.g., salesperson), professional or personal values (e.g., environmentalism), location (e.g., New York), social interactions (e.g., trendsetter), emotional traits (e.g., generally negative), user-defined characteristics, or others.

Relationship storage unit 111 may store information regarding relationships between one or more characteristics, individuals, groups of characteristics, metrics, data items, or groups thereof. Relationship storage unit 111 may also store values, weights, or other information calculated by processing module 104 or visualization module 108.

Data item storage unit 116 may store data collected by data collection module 130. Data item storage unit 116 may also store metadata associated with the data items, describing the data item. For example, metadata may include the data source the data item was collected from, the time the data item was posted or created, the time the data item was collected, the type of data item (e.g., a blog post), or the individual with which the data is associated. Data item storage unit 116 may also store data items received, or created by characteristic-based server 100.

Metric storage unit 112 may store metrics and sub-metrics for an organization. As used herein, a metric broadly refers to any measurement, criteria, goal, or information of interest to an organization. For example, a given organization may be interested in "brand awareness," or how likely a given person is to recognize the organization's brand. The metric may also be comprised of sub-metrics. As used herein, a sub-metric refers to any information related to a metric. For example, sub-metrics related to brand awareness may include "internet mentions" for that brand, how widely those mentions are distributed, how the mentions describe the brand, number of sales, or others.

Individual descriptor storage unit 114 may store descriptors of specific individuals. As used herein, an individual descriptor includes any information that identifies a specific individual, as opposed to a group of people. Descriptors may include names, addresses, employee numbers, drivers license numbers, credit card and other banking account information, social security numbers, behavioral profiles, relationship or social network information, linguistic styles or writing, voice recognition, image recognition, or any other unique identifiers. In this manner, each descriptor or group of descriptors may be used to identify a unique individual.

Threshold criteria storage unit 118 may store the threshold criteria used to determine when a notification may occur. Threshold criteria may include any value, term, event, or descriptor related to one or more data items, data sources, individuals, characteristics, groups of characteristics, or relationships. The threshold criteria may represent a specific event, (e.g., an individual has changed their job description), a keyword (e.g., an advertising keyword was mentioned in a blog post), a value (e.g., a relationship is at, above, or below the criteria), a transaction (e.g., an individual has booked a flight), or any other criteria about which the organization wishes to be informed.

Note storage unit 120 may store notes, consisting of information entered by one or more users, which are associated with one or more individual descriptors, groups, relationships, metrics, sub-metrics, data items, or data sources. The information may include textual, graphical, audio, or video information. For example, a user may enter a description of a specific group, as the "treehugger" group. This description may allow users to more easily refer to, and understand the characteristics that comprise that group.

Group storage unit 122 may store groups, consisting of a plurality of characteristics, or other groups. These groups may allow users to more easily identify and understand categories of individuals.

Visualization module 108, as shown in FIG. 1, may further include a selection module 132 and a calculation module 134. Selection module 132 may include components for receiving user selections from network interface module 102. For example, selection module 132 may allow users on remote terminals to make selections. User selections may consist of one or more individual descriptors, metrics, sub-metrics, characteristics, groups, data items, data sources, or groups thereof. Calculation module 134 may include components for determining the relationships between the selected groups and the remaining groups, data items, metrics, sub-metrics, characteristics, data sources, and individuals. This may include using the relationships to calculate an overall relationship for a group with respect to the other groups, data items, metrics, characteristics, data sources, and individuals. Calculation module 134 may also receive weights associated with a group, data item, metric, sub-metric, characteristic, data source, or individual, and use the weights in conjunction with the stored relationships when determining the overall relationship for a selection. Visualization module 108 may use the calculated values for a selection to build a screen containing at least one selection, and a representation of the overall relationship between that selection and at least one other selection. Visualization module 108 may also include additional information about the selection in the screen. For example, and as discussed in more detail below, selection module 132 may receive a selection of an individual and a selection of a metric. Calculation module 134 may determine the overall relationship between the individual and metric based on the stored relationships. Visualization module 108 may return a screen containing information about the individual and a single descriptor of the overall relationship.

Characteristic server 100 may consist of a single computer or mainframe, containing at least a processor, memory, storage, and a network interface. Server 100 may optionally be implemented as a combination of instructions stored in software, executable to perform the steps described below, and a processor connected to the software, capable of executing the instructions. Alternatively, server 100 may be implemented in a number of different computers, connected to each other either through a local-area network (LAN) or wide-area network (WAN). Data collection module 130 may optionally comprise search engine tools known in the art, operable to find data sources and data items relevant to the search criteria, such as an individual. Storage units 110-122 may comprise any computer-readable medium known in the art, including databases, file systems, or remote servers.

Figure 2:
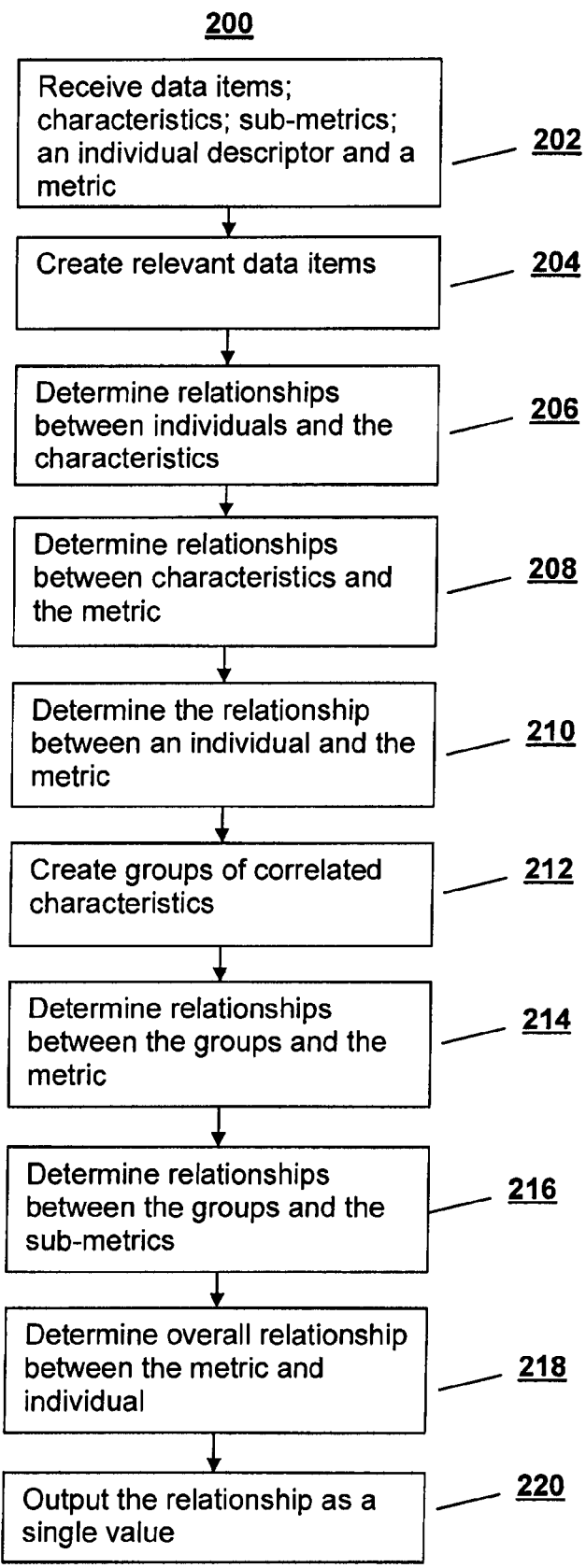
FIG. 2 is a flowchart depicting one process for determining a relationship score for an individual relative to a metric.

FIG. 2 is a flowchart demonstrating an exemplary process 200 for characteristic-based profiling consistent with the present invention. For example, characteristic-based system 100 may use process 200 to determine the relationship between an individual, or groups of individual descriptors, and a user-specified metric based on a number of characteristics. As shown in FIG. 2, process 200 may begin by receiving a number of characteristics, an individual descriptor, and a metric. A metric broadly refers to any measurement, goal, interest, parameter, or other information that an organization may be interested in learning.

In one embodiment, the metric will be an overall goal or measurement related to a business. In this embodiment, the system uses the data and characteristics to obtain information about existing and potential customers that are positively and negatively related to the metric. However, the system may also be used to identify other factors related to the metric, such as characteristics, groups of characteristics, data sources, or sub-metrics. By recognizing new characteristics as data is processed, the system may also identify new, previously unknown, customers or groups of customers related to the metric. For example, the system may use a pattern recognition module 126, described above, to determine patterns of data that are not defined as characteristics, but which occur on a regular basis. Once recognized, the system may automatically define these patterns as new characteristics.

As discussed above, characteristics broadly refer to any attribute, trait, value, or other factor associated, whether objectively or subjectively, with an individual or group of individuals. For example, characteristic types may comprise: social network (influencer, follower, etc.); sentimental (positive, neutral, etc.); temperamental (emotionless, dramatic, etc.); attitudinal (health conscious, eco-friendly, etc.); psychographic (personality factors, personality-derived factors, etc.); demographic (age, gender, etc.); transactional (past purchases, rewards, etc.); firmographic (employment, rank, etc.); data item attributes (data source; author, etc.), cognitive dimensions of thinking (i.e., evaluative, schedule-driven, etc.), or other descriptions of groups or categories of people. A characteristic may be an objective factor, such as age or income, a subjective factor, such as "eco-friendly," or a combination of objective and subjective factors. These characteristics are typically selected by a user, based on known templates, or on the types of individuals they believe will be relevant to one or more metrics or sub-metrics. Alternatively, or in addition, and as described in more detail below, the system itself may identify characteristics that are relevant to the metric as it analyzes the data items. These characteristics may also be obtained or purchased from other data sources, such as marketing databases, or public websites, discussion boards, or databases.

Individual descriptors broadly refer to any information that may be used to identify a specific individual, including account information, license numbers, phone numbers, email addresses, name, relationship information, behavioral profile, nicknames or aliases, or any information that may be used to differentiate one individual from a group. These descriptors may be received from organizations, users, or internal or external data sources, as described below. Further, an individual descriptor may contain multiple pieces of information that collectively identify a specific person. For example, an individual descriptor may consist of a name, driver's license number, credit card account number, and street address, which may be used collectively to identify a specific person. This example is not limiting, and any information that uniquely identifies an individual may be part of an individual descriptor. For another example, an individual descriptor may consist only of social network information, which describes a person by their social or business relationships to others.

At step 202, the system may receive a plurality of data items, characteristics, sub-metrics, an individual descriptor, and a metric. The data items may be received from a plurality of data sources. At step 204, the system may create relevant data items for the individual. In one embodiment, the system accesses all data sources that may have relevant information about the metric. These data sources may comprise; internal data sources (e.g. crm, payroll, etc.), privately-shared sources (e.g., suppliers, partners, etc.), user-authorized data sources (e.g., social media accounts, etc.), public data sources (e.g., blogs, tweets, etc.), or purchased data sources (e.g., data aggregators, credit card db, etc.). As discussed above, the purchased data sources may also contain characteristics, metrics, or individual descriptors. In another embodiment, the system may only access data from sources that have been marked as relevant for one or more individual descriptors, metrics, groups, or sub-metrics.

In general, data sources may contain both structured, and unstructured data, which may be qualitative and subjective, quantitative and objective, or a combination of both. Structured data broadly refers to any data that is placed into a pre-existing structure such as a database, spreadsheet, or form. Unstructured data broadly refers to data that does not have a defined structure, such as prose, news articles, blog posts, comments, messages, emoticons, images, video, audio, or other freely-entered data. Quantitative and objective data broadly concerns factual, measurable subjects. For example, quantitative data may be described in terms of quantity, such as a numerical value or range. In comparison, qualitative and subjective data broadly describes items in terms of a quality or categorization wherein the quality or category may not be fully defined. For example, qualitative and subjective data may describe objects in terms of warmth and flavor. The system may use an appropriate relationship-determination module (i.e., a software component, a hardware component, or a combination of a software component and a hardware component), utilizing techniques known in the art, to determine the strength of the relationship between the data items and the individuals. This relationship strength consists of a number or descriptor indicating the magnitude of the relationship. The strength of the relationship represents how strongly the data item is related to a specific individual descriptor. For example, a data item discussing the name, address, and family members of the individual would have a strong relationship to an individual descriptor containing the same information. Likewise, a data item that did not mention any of the information comprising the individual descriptor would not have a strong relationship to that descriptor. In this manner, the system may determine which individuals are associated with the data item. The system may also use other methods to identify the individual associated with, or likely to be associated with a data item. For example, the data item may be associated with a known individual descriptor, such as a username, account, or name.

These data items will be strongly correlated with any individual descriptor containing a matching user name, account, or name. In another embodiment, the system may determine when the data item refers to a pseudonym, or includes missing information about an individual. For example, when a data item strongly relates to a known descriptor, but the names do not match, the system may use additional methods to determine whether the two individuals are the same. In such a case, the system may create a pseudonym item, containing a descriptor of the individual associated with the data item. If additional data items are also found to have a strong relationship to both the individual descriptor and the pseudonym, the system may add the information from the pseudonym to the individual descriptor. In this manner, future data items relating to the pseudonym may be identified with the individual. If no strong relationship is found, the system may use the pseudonym to create a new individual descriptor.

The system may automatically use the pseudonym to create a new individual descriptor, or add the pseudonym information to an existing individual descriptor, if threshold relationship strengths are met. For example, if the relationship strength between the pseudonym and the descriptor reaches a set value, the system may automatically merge the two. Likewise, if the relationship strength falls below a certain threshold, the system may automatically create a new descriptor based on the pseudonym. This behavior is not limited to names, and the system may perform this action when any of the information in the individual descriptor does not match the information in the data item. In this manner, the system is capable of collecting new information about the individuals, as well as recognizing new individuals.

If a strong relationship exists between the data item and an individual descriptor, the system creates an association between the data item and the individual descriptor. The system will also mark the data source as relevant to the individual descriptor, so that it may be identified more quickly in the future. The system will next use an appropriate method known in the art, such as, for example, natural language processing, to identify the portions of the data item that are relevant to the individual. The system uses the relevant data portions to create a new data item, containing only the data relevant to one or more individual descriptors.

Although the above aspects of the system discuss descriptors, characteristics, metrics, and relationships for clarity, it should be understood that these are exemplary. The system may operate on any set of information atoms in general, and is not limited to these examples. Information atoms broadly refer to any component of information represented in the system, such as data items, metrics, sub-metrics, individual descriptors, characteristics, relationships, sentiments, notes, metadata, or groups thereof. The system may determine a relationship between two information atoms, regardless of whether those information atoms consist of data items, characteristics, or even other relationships. In this manner, the system may flexibly handle new types of information, and analyze relationships that may otherwise go unnoticed.

At step 206, the system uses a suitable relationship-determining module (i.e., a software component, a hardware component, or a combination of a software component and a hardware component) to determine the relationship between the individual descriptors and the characteristics. The relationship-determining module may comprise algorithms known in the art, including one or more of; natural language processing, textual analysis, contextual analysis, direct 1-to-1 mapping, artificial intelligence, image analysis, speech analysis, sentiment analysis, or other suitable techniques known for determining correlations, patterns, sentiments, emotions, temperaments, or relationships. The relationship consists of a magnitude, indicating the strength (or lack thereof) of the relationship, and a direction, indicating whether the relationship is positive, negative, or neutral. As used in this application, the direction simply indicates whether a given relationship represents a positive correlation (i.e. positive direction), a negative correlation (i.e., negative direction), or no correlation (i.e. neutral direction). For example, an individual who has repeatedly shown "eco-friendly" behavior and attitudes will be positively correlated with an "eco-friendly" characteristic.

In this case, the characteristic and individual descriptor would have a strong, positive relationship. Similarly, an individual who displays hostility towards "eco-friendly" topics and ideas would be negatively correlated with the "eco-friendly" characteristic. The individual descriptor for this person would have a strong negative relationship with the "eco-friendly" characteristic. Finally, an individual who did not correlate to the "eco-friendly" characteristic would have a neutral relationship with it.

Figure 3:
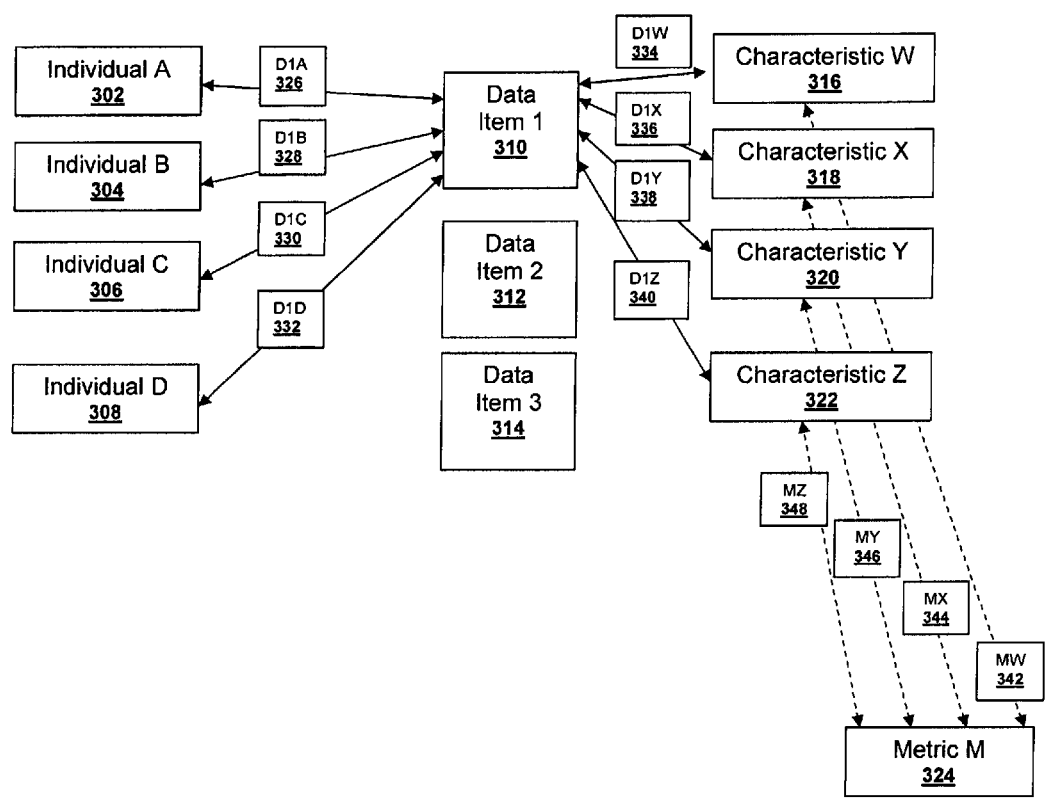
FIG. 3 is a block diagram depicting an example of relationships between characteristics, metrics, data items, and individuals.
Figure 4:
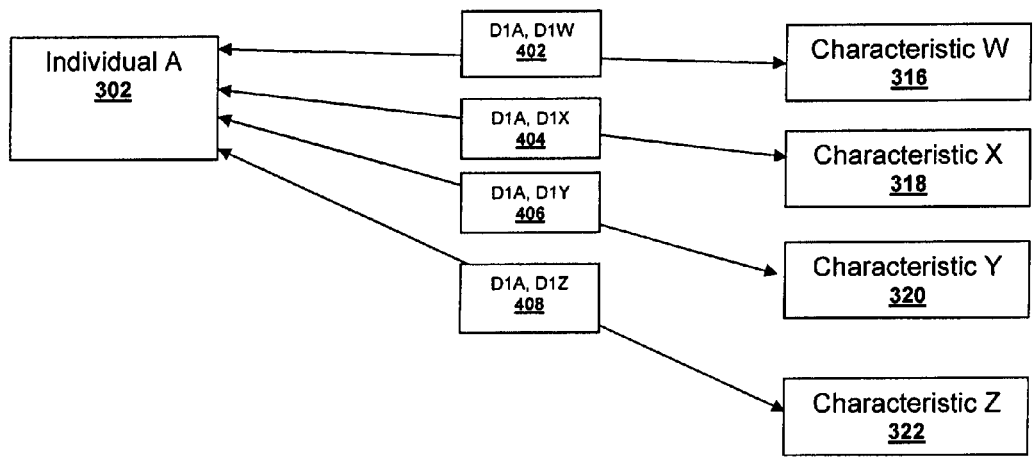
FIG. 4 is a block diagram depicting an example of relationships between individuals and characteristics.

To determine this relationship, the system may use a relationship-determining technique known in the art to determine the relationship between the data items and the characteristics. This relationship may consist of a magnitude and a direction. The system may also calculate a value for a characteristic based on the relationship between the characteristic and the data item, and the relationship between the data item and the individual descriptor. This is represented in FIG. 3, items 326-332 (first set of relationships) and 334-340. For example, the relationship between individual A 302 and characteristic W 316 will be determined based on second relationship D1W 334 and first relationship D1A 326; where second relationship D1W 334 represents the relationship between characteristic W and data item 1 310, and first relationship D1A represents the relationship between data item 1 and individual A. The combined relationships will be stored with the characteristics, and associated with the individual descriptor as shown in FIG. 4. The combined scores based on D1A, D1W, 402 to D1A, D1Z 408 are associated with the relationship between individual A 302, and characteristics W 316 to Z 322.

Figure 5:
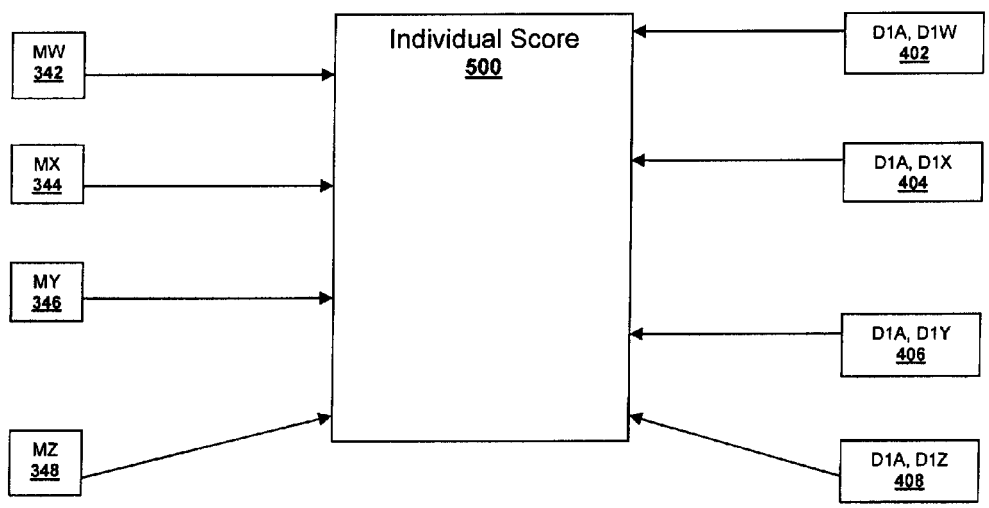
FIG. 5 is a block diagram depicting an example score for an individual related to a metric.

Returning now to FIG. 2, at step 208, the system may also determine the relationship between the characteristics and the metric. This relationship may also consist of a magnitude and direction, as described above. The system may determine this relationship using a suitable relationship-determining module (i.e., a software component, a hardware component, or a combination of a software component and a hardware component), known in the art. FIG. 5 illustrates an example of the third set of relationships determined between characteristics W 316 to Z 322, and metric M 324, represented by MW 342 to MZ 348 respectively.

At step 210, the system may determine the relationship between individual descriptor 302 and metric 324. The system may determine this relationship using a suitable relationship-determining module, as described above. This relationship may also consist of a magnitude and direction, as described above. As shown in FIG. 5, this relationship may be determined based on the relationships between characteristics 316-322 and metric 324, represented by MW 342 to MZ 348, and the relationships between the individual 302 and characteristics 316 to 322, represented as D1A, D1W 402 to D1A, D1Z 408 (the sixth set of relationships).

At this point, the system may output individual-metric relationship 500, representing the strength of the relationship between individual 302 and metric 324. This score may be represented as a numerical value, a descriptor, an image, or any other means of conveying the overall magnitude and/or direction of the relationship between individual 302 and metric 324.

In another embodiment, the system may store a "baseline" sentiment for each relationship. For example, when a relationship is first calculated between two items, the system may store the sentiment associated with that relationship as a baseline for the relationship. The sentiment may include any type of meaning, such as a general temperament or mood, an emotion towards a specific thing, or a temporary change in mood. Multiple baselines can be created for an individual based on any number of factors identified as significant, such as context (e.g., with whom the individual is conversing, where the individual is, what did the individual just do or encounter, and what's happening in the world), subject matter, and time. Machine learning, sentiment analysis, natural language processing, image analysis, contextual analysis, voice recognition and speech analysis, and other suitable techniques may be used to identify sentiments, create baselines, and identify the degree of difference from one or more baselines and determine the significance of such difference with respect to the individual, other individuals, and a business. When computing or forecasting future relationships between the same or similar items (with respect to either the same individual or a different individual for purposes of forecasting or comparison) the system may compare the new relationships to one or more of the baseline relationships, in order to determine in what manner and to what extent they differ from one or more of the baselines. The system may determine whether these differences are associated with other data items such as specific topics, interests, events, interactions, situations, noises, or images. These differences may also be associated with a specific time, date, or location. The system may also determine whether the differences are associated with exposure to any other individual, any group of individuals, or any particular media, such as music, television, movies, books, radio, the Internet and specific webpages or a category thereof, mobile applications, advertisements, or promotions. The system may also determine whether the differences are associated with any particular temperature, body temperature, or geographic location. The system may also store these differences. In this manner, the system may calculate and store the changes in each relationship over time. The system may also calculate relationships between each difference and all the other stored items. In this manner, the system may identify how each change in sentiment is related to other relationships, individuals, and other changes in sentiments and business circumstances. For example, a strong relationship between a data item related to one individual that has a strong positive sentiment towards a data item, and differs from that relationship's baseline may be related to other individuals' also expressing strong positive sentiment towards the same item. Or, it may be related to other individuals' expressing mild negative sentiments towards a different data item. Using pattern recognition module 126, the system may also identify patterns in these relationships over time. Likewise, the system may identify patterns in one or more of the baselines over time. The system may also use machine learning or other suitable techniques, as mentioned above, to recognize new baselines in one or more relationships, as more information is collected.

Figure 6:
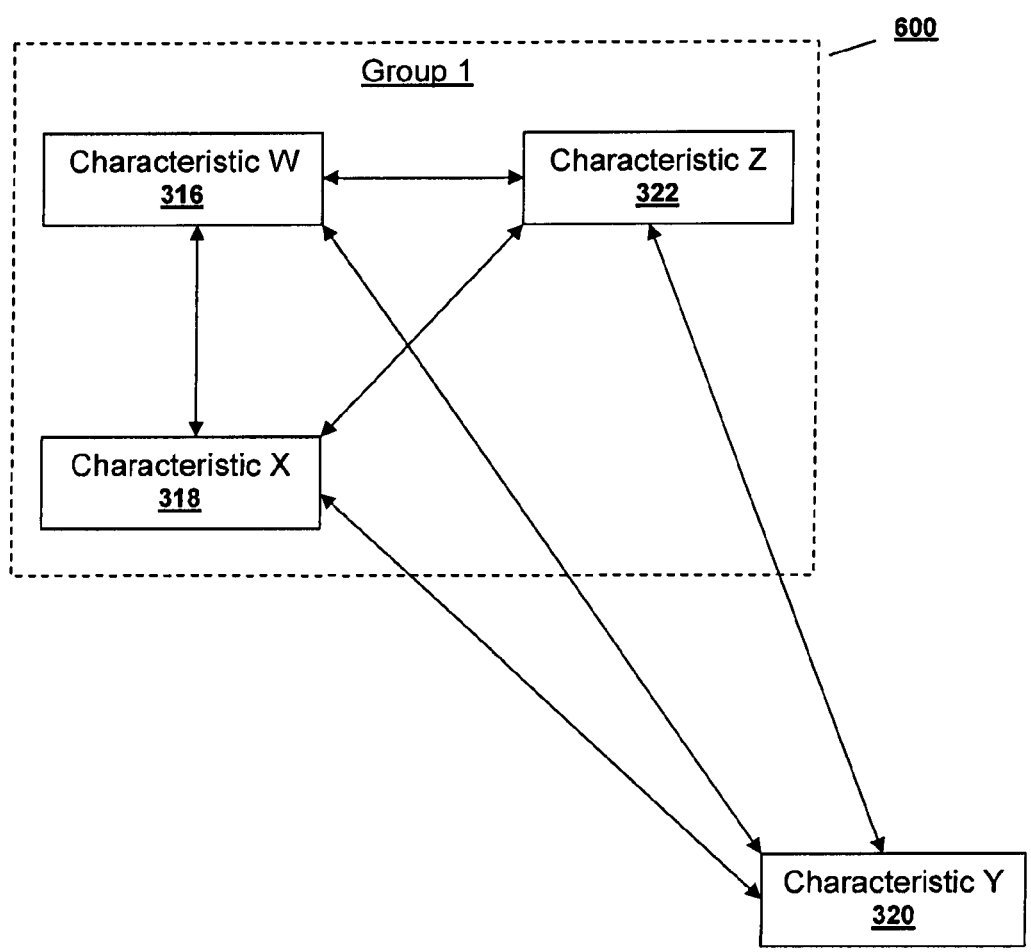
FIG. 6 is a block diagram depicting an example group of characteristics.

In another embodiment, the system may identify groups of characteristics, in order to determine the relationship between the groups and the metric. In this embodiment, the system may also use a suitable relationship-determining module, as described above, to determine the relationships between the characteristics. At step 212 in FIG. 2, the system may identify groups of characteristics that have strong relationships to each other using grouping module 124. As shown in FIG. 6, characteristics W 316, X 318, and Z 322 are strongly related, and the system may group them into group 1 600. Because characteristic Y 320 is not strongly related to the others, the system may not include it in group 1 600.

Figure 7:
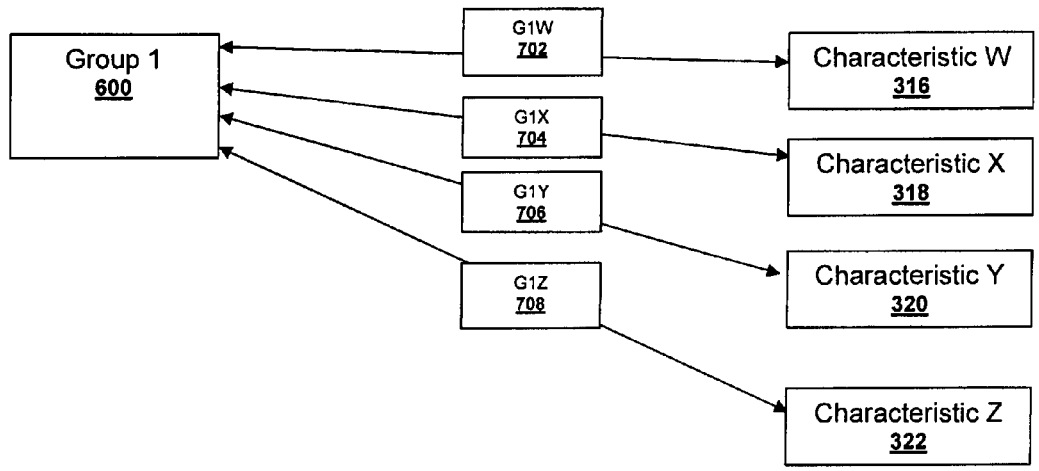
FIG. 7 is a block diagram depicting an example of relationships between groups and characteristics.
Figure 8:
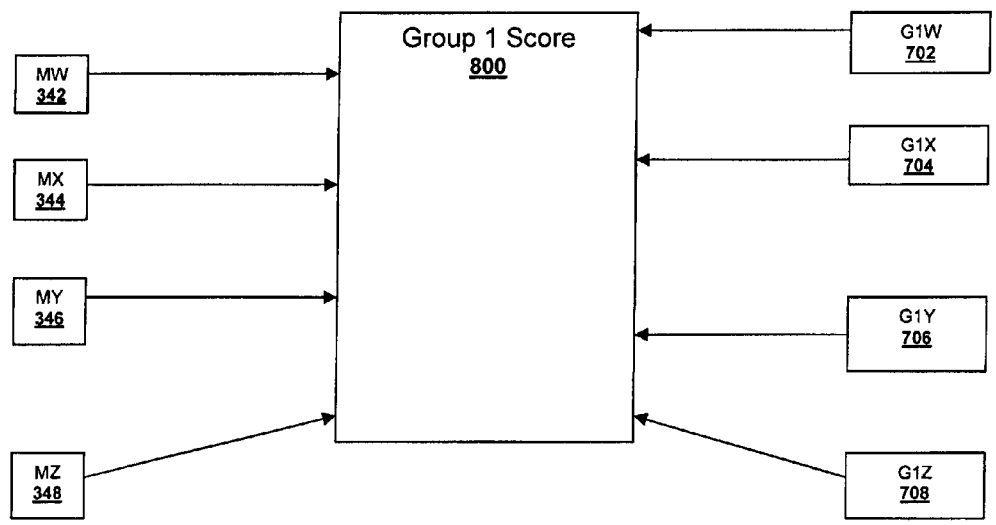
FIG. 8 is a block diagram depicting an exemplary score for a group.

At step 214 in FIG. 2, the system may also determine the relationship between the groups and the metric, based on the underlying characteristics. For example, the system may use a suitable relationship-determining module, as described above, to determine the relationships between the groups and the characteristics. For example, as shown in FIG. 7, the system determines a fourth set of relationships G1W 702 to G1Z 708 based on the relationship between group 1 600 and characteristics W 316 to Z 322. As described above, the relationship may contain a magnitude and direction. As shown in FIG. 8, the system may determine the group-metric relationship 800 (one of the fifth set of relationships) between group 1 600 and metric 324 based on the third set of relationship values MW 342 to MZ 348 and the fourth set of relationships G1W 702 to G1Z 708. As described above, the system may output group-metric relationship 800, which may be represented as a numerical value, a descriptor, an image, or any other means of conveying the magnitude and/or direction of the relationship.

Figure 9:
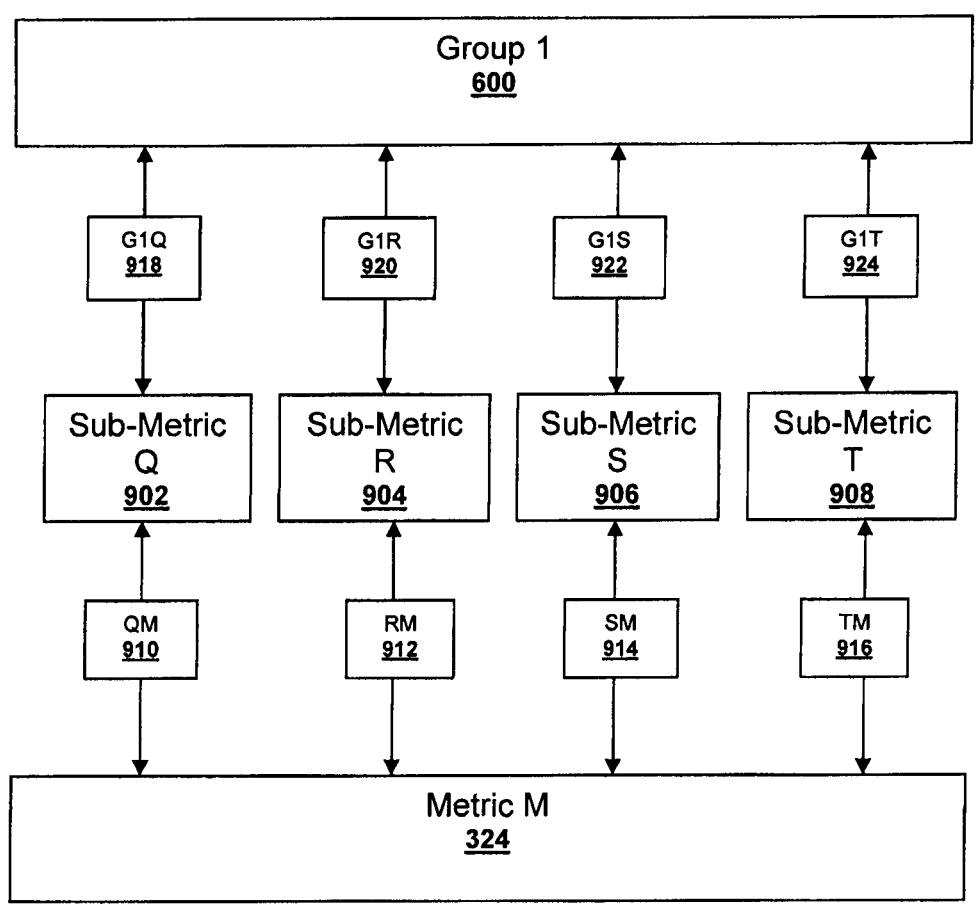
FIG. 9 is a block diagram depicting relationships used to determine sub-metric scores.

In yet another embodiment, the system may also determine the relationship between the sub-metrics and the metric. For example, at step 216, the system may also use a suitable relationship-determining module, as described above, to determine the relationships between the groups of characteristics and the sub-metrics. For example, as shown in FIG. 9, the system may determine a tenth set of relationships, the metric-sub-metric values QM 910 to TM 916 based on the relationship between metric M 324 and sub-metrics Q 902 through T 908. The system may also determine a ninth set of relationships, the group-sub-metric values G1Q 918 through G1T 924, based on the relationships between group 1 600 and sub-metrics Q 902 through T 908. As described above, the relationship may contain a magnitude and direction. The system may also determine the overall relationship score for the sub-metrics, based on the group-sub-metric values and metric-sub-metric values. For example, the system may determine an overall relationship for sub-metric Q 902 to metric M 324 based on G1Q 918 and QM 910. The system may output this information, as described above. In this manner, the system may determine which of the sub-metrics have the strongest relationship to the overall metric M 324.

Figure 10:
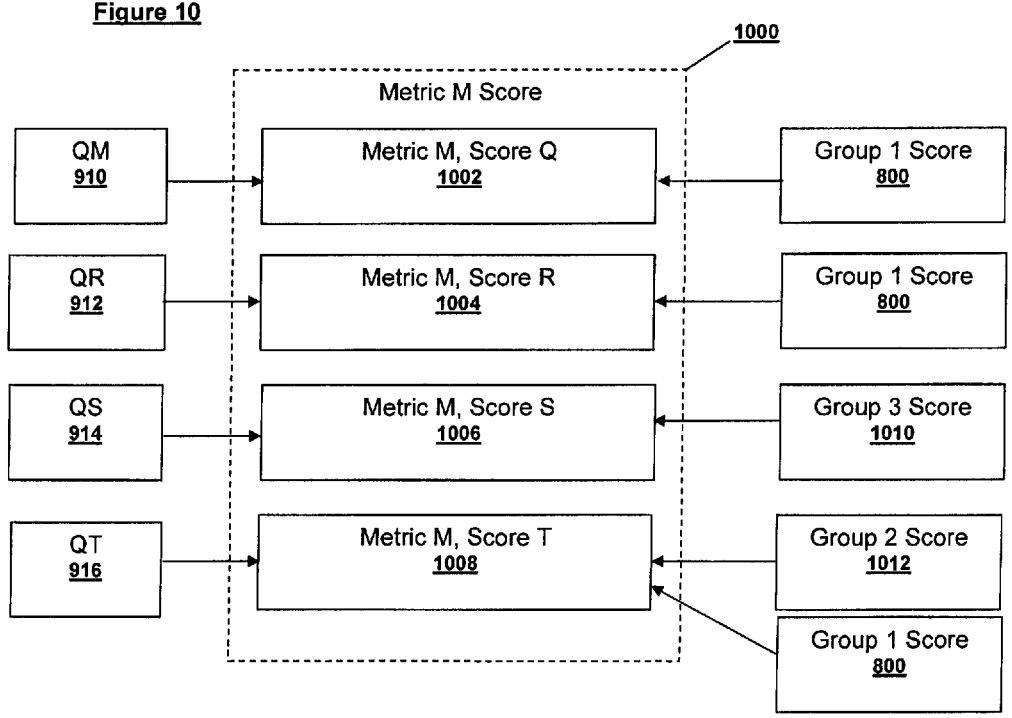
FIG. 10 is a block diagram, depicting relationships used to determine scores for a metric.

At step 218, the system may also determine an overall score for a metric, representing how successful the company is in meeting its metric, based on the collected data. For example, FIG. 10 shows an example of overall metric score 1000, based on a plurality of metric sub-scores, 1002-1008. The metric sub-scores are determined based on the metric-sub-metric values 910-918, as well as the group scores 800, 1010, 1012 for one or more groups having strong relationships to the sub-metrics. The system may determine score 1000 for the metric based on one or more of the sub-scores 1002-1008. As described above, the system may output this score using a suitable descriptor or value, at step 220.

Figure 11:
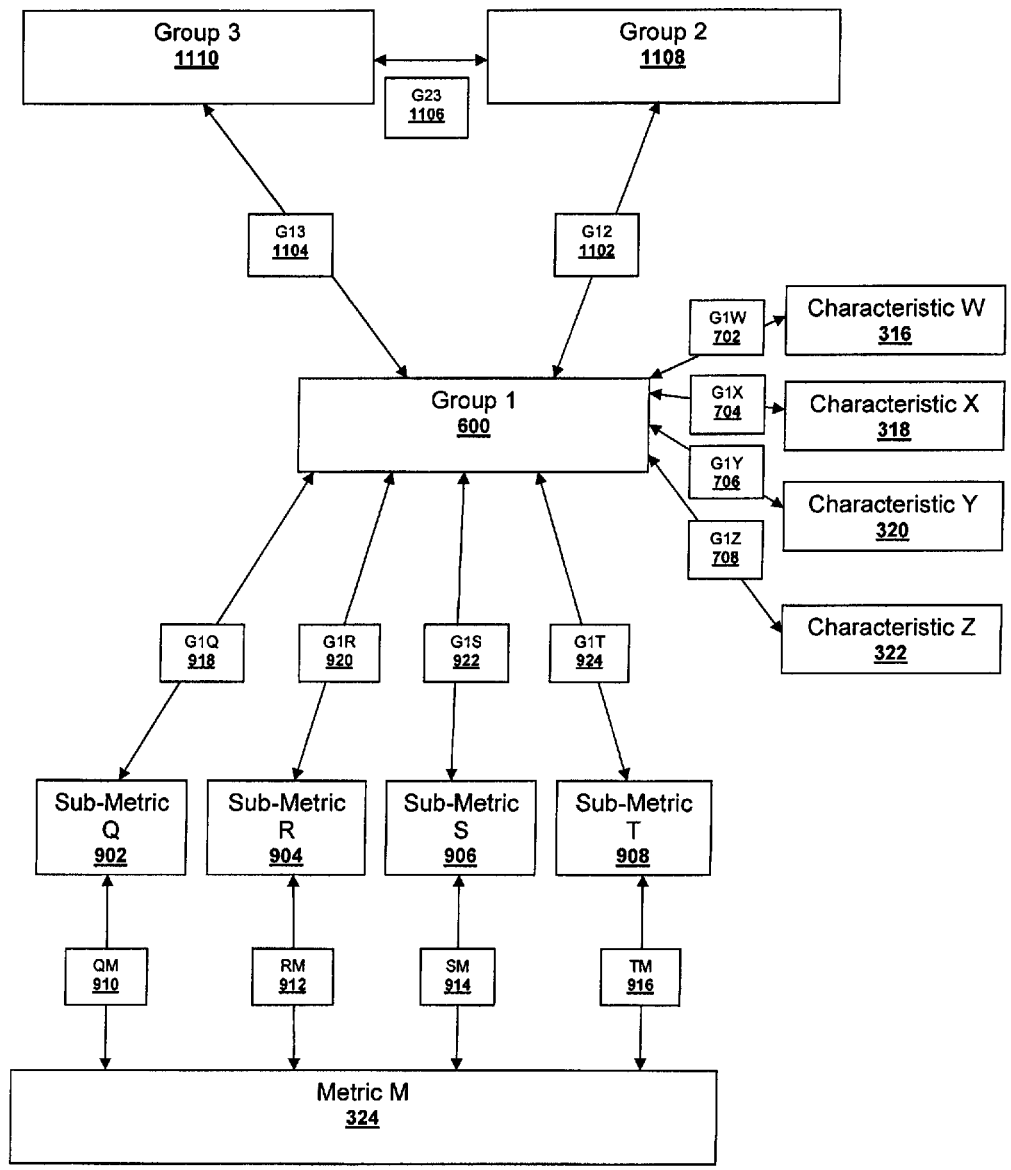
FIG. 11 is a block diagram, depicting relationships between groups, characteristics, sub-metrics, and a metric.

FIG. 11 shows another example of the relationships between groups, characteristics, sub-metrics, and the metric. In one embodiment, the system may use a suitable relationship-determining module, as described above, to determine an eighth set of relationship between groups, represented as G12 1102, G13 1104, and G23 1106. The system may identify groups of characteristics that have strong relationships to each other using grouping module 124. In this manner, the system may also create larger groups, in the event that less granularity is desired.

It should be apparent from the above description that a similar process may be performed starting with any metric, sub-metric, or characteristic. For example, the system may perform a similar process to calculate an individual score for a sub-metric with regard to a metric. It should also be apparent that the steps may be performed in any order, and that some steps may be omitted. It will also be apparent to a person having skill in the art that although the example discussed concerns business metrics and customers, the system may be broadly used for other applications as well. For example, an organization may have specific criteria for suitable participants in a clinical trial. In this embodiment, the metric would represent the criteria necessary to be a suitable participant, and the system would allow the organization to identify individuals who had a strong relation to the criteria. Likewise, a metric may be an organization's performance goals for its employees, allowing the system to identify the individual employees with the strongest relationship to those performance goals.

In another aspect of the system, a map of relevant data may be built from internal data, in order to identify relevant characteristics and data sources. For example, an organization may already possess information about its customers or relevant individuals. The system may analyze this data, using the steps described above. The system may use pattern recognition module 126 to identify relevant characteristics. Once the internal data has been processed, the system may use these characteristics when analyzing data from external data sources. This may save time and increase performance, since the system will use fewer irrelevant characteristics when analyzing the new data. Additionally, in this manner, the system may use information describing individuals it is interested in, without revealing any of the individuals' descriptors. This is because only characteristics, groups, or other mapped data is used when accessing external data sources.

Figure 12:
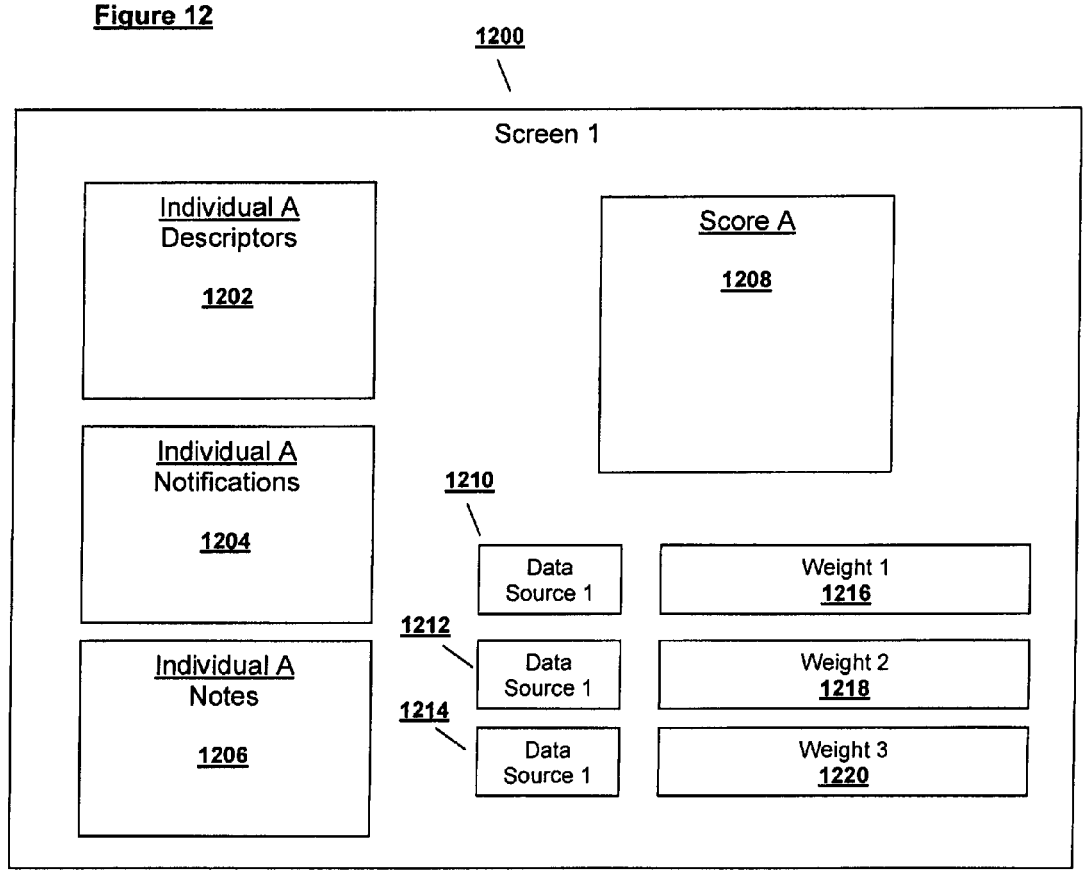
FIG. 12 is a block diagram depicting a sample user screen displaying an individual and their score.

FIG. 12 shows an exemplary embodiment of a visualization screen for an individual. Screen 1200 may comprise an individual descriptor window 1202, a notification window 1204, a note window 1206, a score window 1208, and one or more data source identifiers 1210-1214 and weight selection windows 1216-1220. Individual descriptor window 1202 may contain information describing an individual, based on the individual descriptor for that individual. Notification window 1204 may display any notifications related to the individual. Note window 1206 may display notes related to an individual. Note window 1206 may also allow remote users to enter notes, which will be stored and associated with the individual's descriptor. Thus, the notes related to an individual may be entered by a user, and associated with that user, or available to all users. Score window 1208 may contain the overall score for the user, relative to a metric, as computed above. Source identifiers 1210-1214 may contain icons, text, or other indicators of data sources that have strong relationships to the individual, as determined above. Weight selection windows 1216-1220 allow remote users to view the current weights assigned to the data sources. Weight selection windows 1216-1220 may also allow remote users to enter new weights for the data sources, causing visualization module 108 to re-calculate relationships and scores as described above. Thus, screen 1200 allows users at remote terminals to view information related to individuals, such as the individual's descriptor, notes, notifications, and score. One or more of these components may be missing, or present in a different quantity, or different positions than shown.

Figure 13:
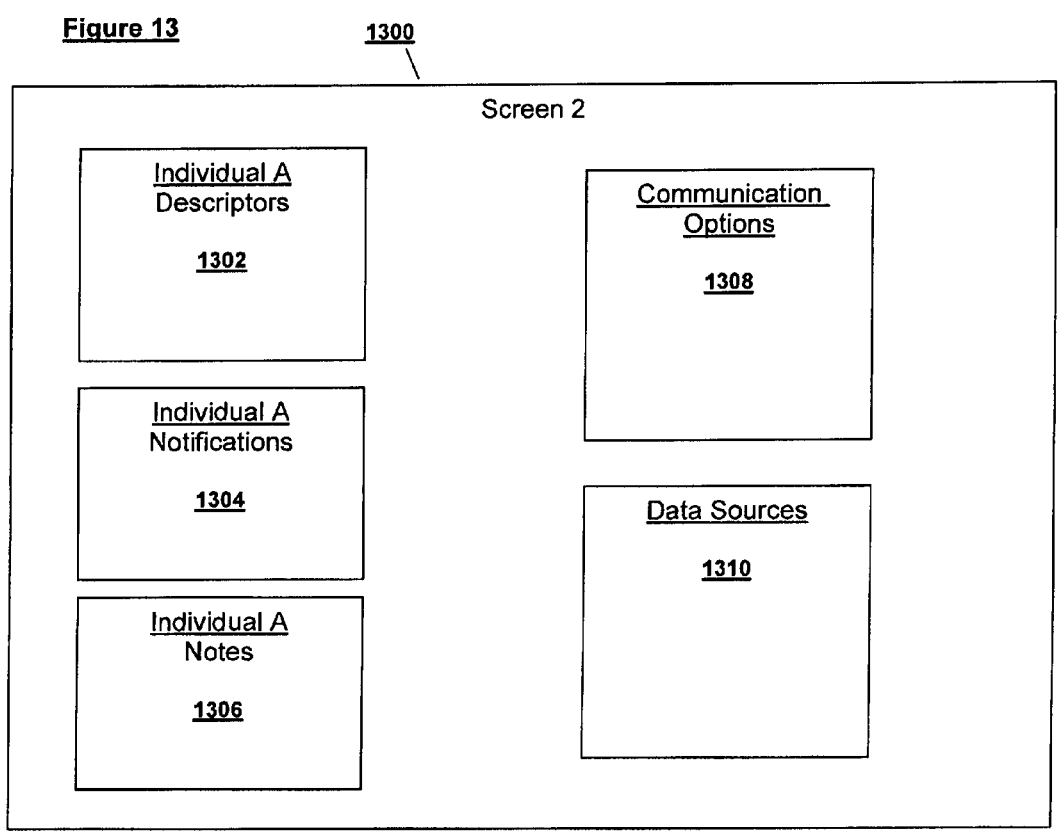
FIG. 13 is a block diagram depicting a sample detail screen for an individual.

FIG. 13 shows an alternative embodiment of a screen related to an individual. Screen 1300 may comprise an individual descriptor window 1302, notifications window 1304, note window 1306, communication options window 1308, and data sources window 1310. Communication options window may contain one more representations of the preferred communications methods for the individual. Preferred communications methods may be determined by frequency of use, stated preferences, or weights assigned by a user. The preferred communications window may also allow a remote user to select a particular one of the preferred communication methods, in order to send a message to the individual. Upon selection, the system may present the user with a communication screen, allowing the user to enter a message, or otherwise communicate with the individual. One or more of these components may be missing, duplicated, or in different positions than shown.

Figure 14:
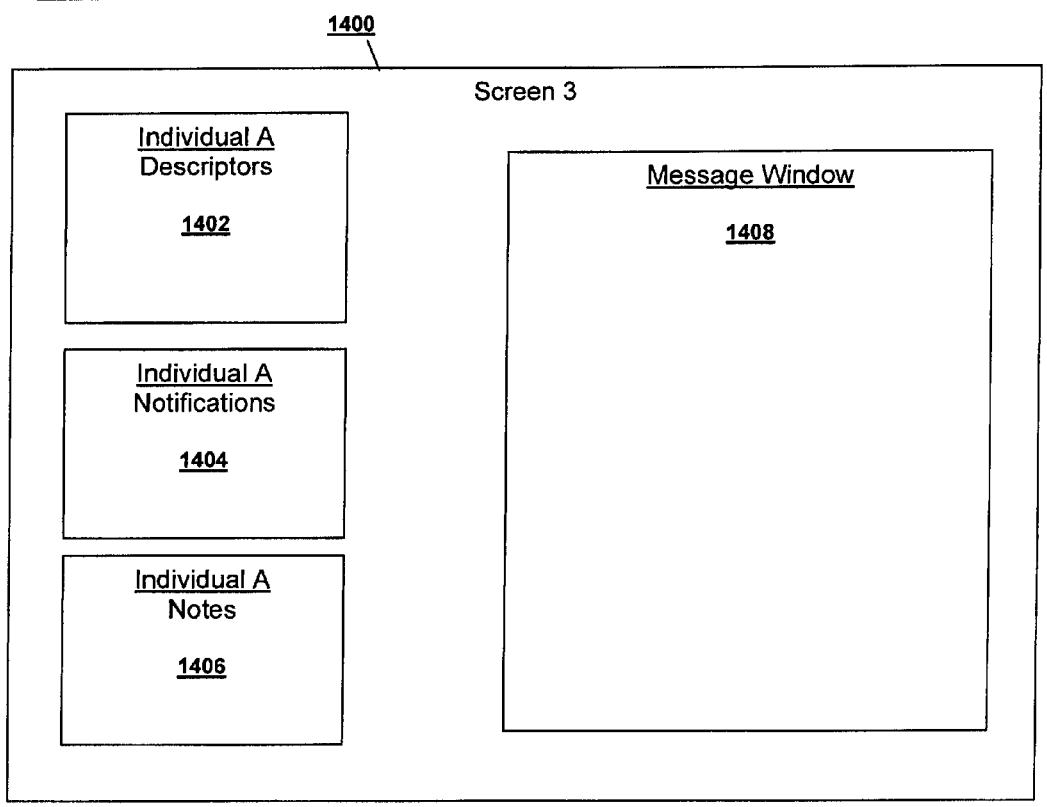
FIG. 14 is a block diagram depicting a sample communication screen for an individual.

FIG. 14 shows exemplary communication screen 1400, allowing a remote user to send a message to the individual. Screen 1400 may comprise an individual descriptor window 1402, notifications window 1404, note window 1406, and message window 1408. Screen 1400 may permit the remote user to enter a message into the message window, or otherwise communicate with the individual. The system may send the message to the individual, using the selected communication medium, such as email, text message, voice message, video, or other communication methods. Alternatively, the system may use existing communication methods such as voice chat, video chat, instant messaging, or phone to permit the user to communicate interactively with the individual. One or more of these components may be missing, duplicated, or in different positions than shown.

Figure 15:
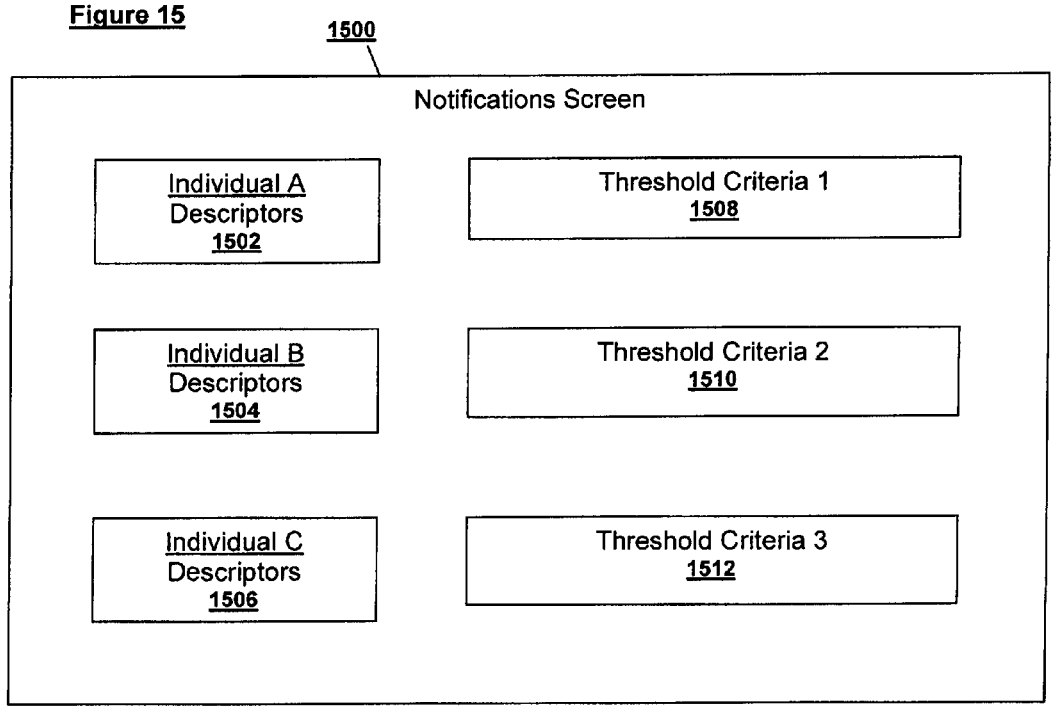
FIG. 15 is a block diagram depicting an example of a general notification screen.

FIG. 15 shows exemplary notification screen 1500, allowing a remote user to view notifications related to multiple individuals. The screen may comprise multiple individual descriptor windows 1502-1506, and one or more threshold criteria windows 1508-1512. Threshold criteria windows 1508-1512 may describe the criteria or event that caused the notifications to be sent. Alternatively or additionally, the threshold criteria windows 1508-1512 may also display one or more data items related to the notification. One or more of these components may be missing, duplicated, or in different positions than shown.

Figure 16:
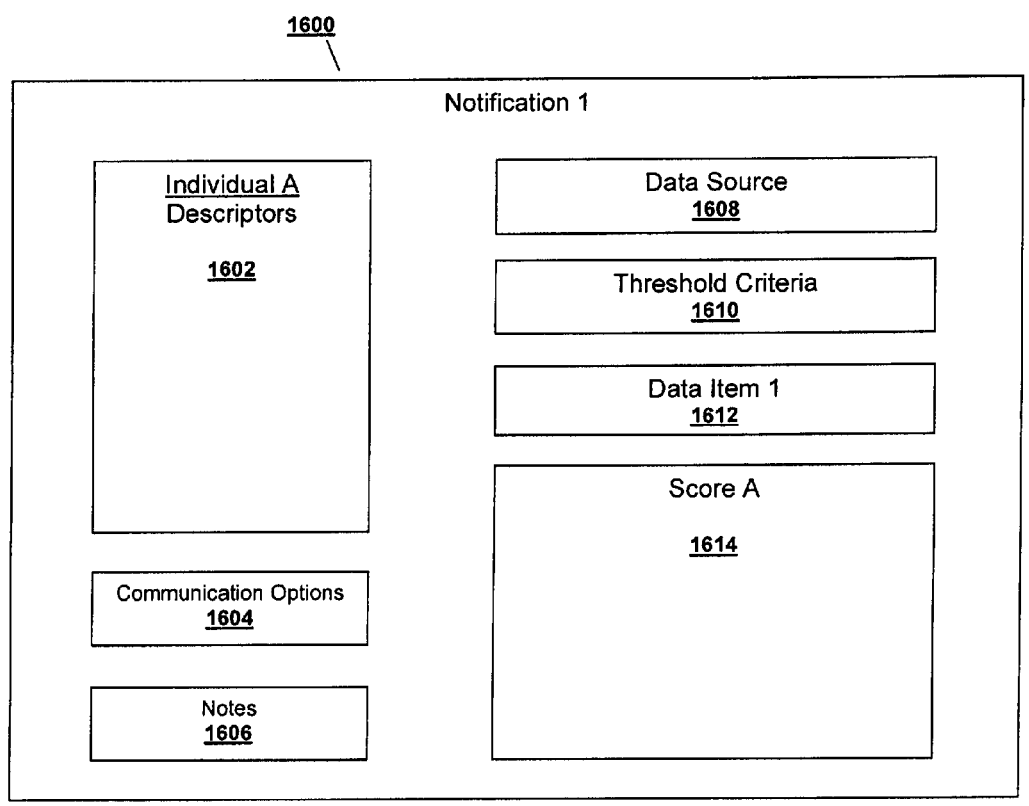
FIG. 16 is a block diagram depicting an example of a specific notification screen for an individual.

FIG. 16 shows exemplary notification screen 1600 for a single individual. The screen may comprise individual descriptor window 1602, communication options window 1604, note window 1606, data source window 1608, threshold criteria window 1610, data item window 1612, and score window 1614. One or more of these components may be missing, duplicated, or in different positions than shown.

Figure 17:
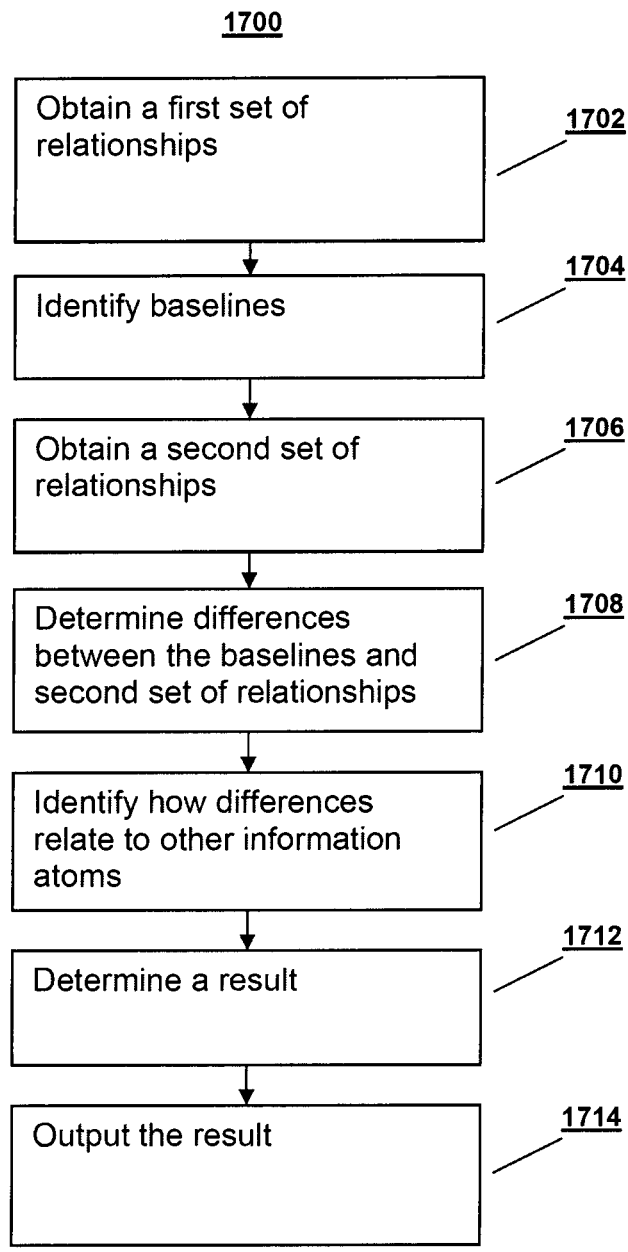
FIG. 17 is a flowchart depicting one process for determining baselines for relationships.
Figure 18:
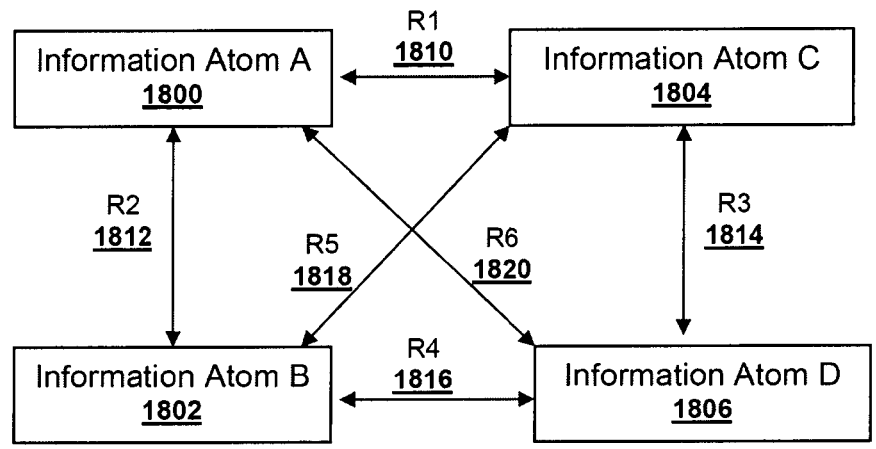
FIG. 18 is a block diagram depicting an example of a first set of relationships between information atoms.

FIG. 17 is a flowchart demonstrating an exemplary process 1700 for determining relationship baselines consistent with the present invention. For example, characteristic-based system 100 may use process 1700 to determine the baseline for relationships between a number of information atoms. As shown in FIG. 17, process 1700 may begin at step 1702 by receiving a first set of relationships between information atoms. This is represented in FIG. 18, showing relationships 1810-1820 between information atoms 1800-1806.

Figure 20:
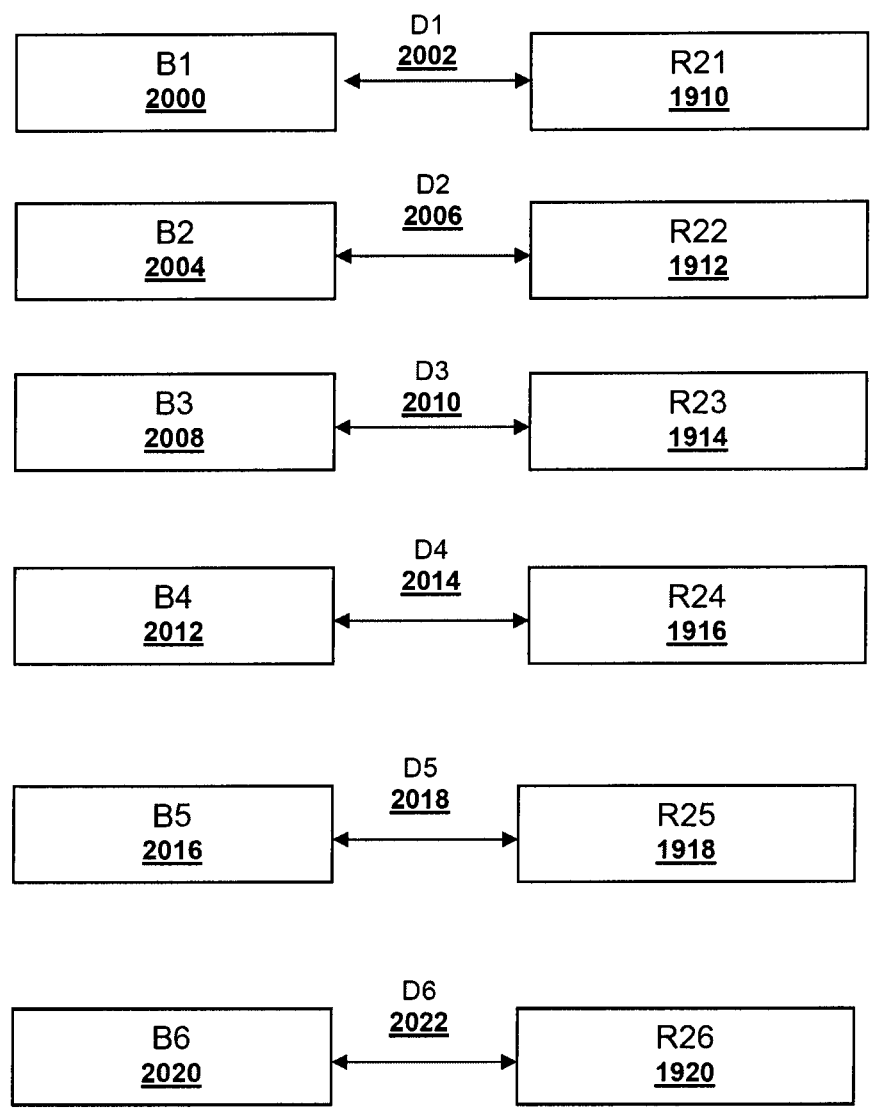
FIG. 20 is a block diagram depicting an example of differences between baselines and relationships.

At step 1704 in FIG. 17, the system may identify baselines for these relationships. These are depicted in FIG. 20 as baselines B1 2000, B2 2004, B3 2008, B4 2012, B5 2016, and B6 2020.

Figure 19:
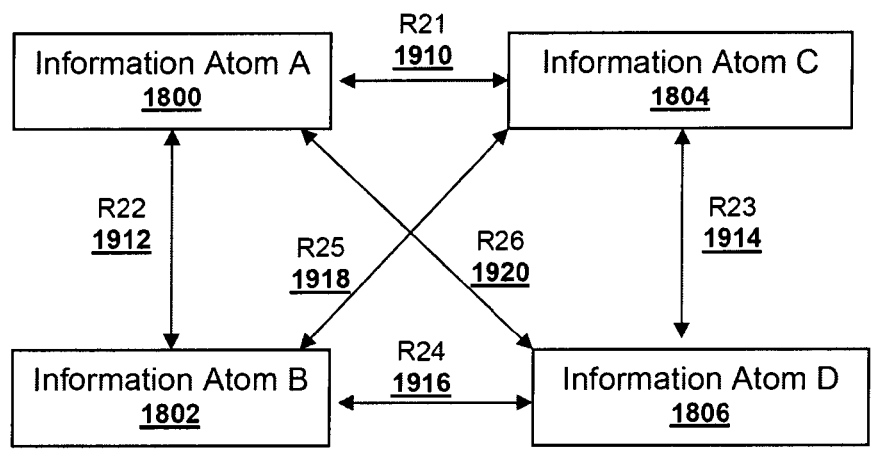
FIG. 19 is a block diagram depicting an example of a second set of relationships between information atoms.

At step 1706 in FIG. 17, the system may receive a second set of relationships between the information atoms. These are represented in FIG. 19 as relationships 1910-1920.

Returning to FIG. 17, at step 1708, the system may determine differences between the baselines and the second set of relationships. These are depicted in FIG. 20, as differences D1 2002, D2 2006, D3 2010, D4 2014, D5 2018, and D6 2022.

Figure 21:
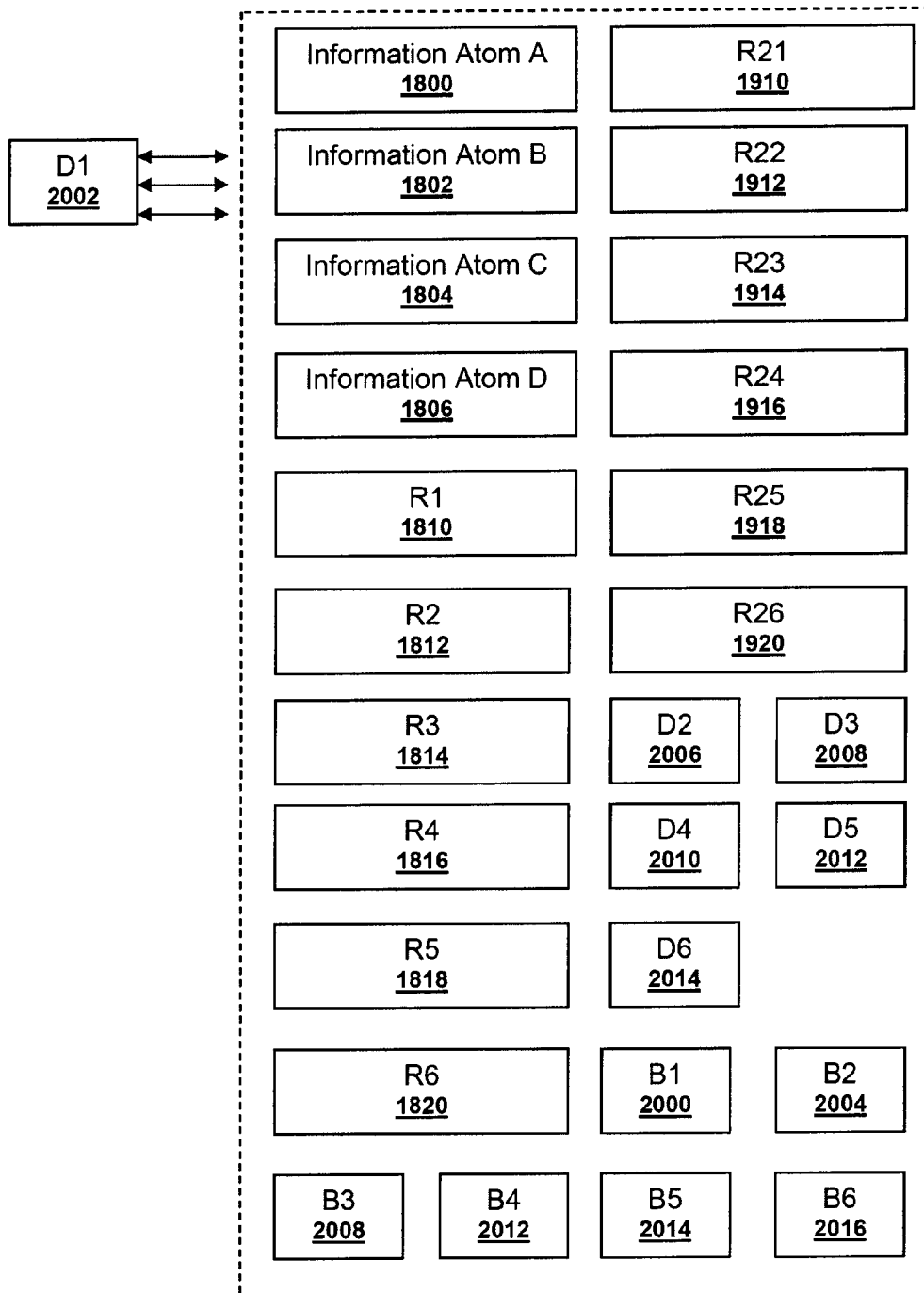
FIG. 21 is a block diagram depicting an example of identified relations between a difference and other information atoms.

At step 1710 in FIG. 17, the system may identify how differences D1 2002-D6 2022 are related to other information atoms. As described above, the term "information atom" broadly refers to any component of information represented in the system, including data items, characteristics, individuals, metrics, sub-metrics, relationships, baselines, differences, or groups thereof. FIG. 21 depicts an example identifying how difference D1 2002 is related to information atoms 1800-1806, first relationships 1810-1820, second relationships 1910-1920, baselines B1 2000-B6 2010, and differences D2 2006-D6 2014. The system may identify how D1 2002 is related, or not related, to the other information atoms. The system may also identify how the other differences D2 2006-D6 2014 are related to the other information atoms.

At step 1712 in FIG. 17, the system may determine a result based on how the differences relate to the other information atoms. At step 1714, the system may output this result. In this manner, the system might identify how differences in the relationships relate to other information atoms. As discussed above, this could allow the system to, for example, identify how a change in sentiment is related to other data such as time, location, recent events, or transactions.

As described above, systems and methods consistent with the invention provide a characteristic-based system that allows an organization to identify, organize, describe, and visualize the relationships between individual descriptors, characteristics, and metrics. For purposes of explanation only, certain aspects and embodiments are described herein with reference to the components illustrated in FIGS. 1-21. The functionality of the illustrated components may overlap, however, and may be present in a fewer or greater number of elements and components. Further, all or part of the functionality of the illustrated elements may co-exist or be distributed among several geographically dispersed locations. For example, each "module" may be embodied as a software component, a hardware component, or a combination of a software component and a hardware component. Moreover, embodiments, features, aspects and principles of the present invention may be implemented in various environments and are not limited to the illustrated environments.

Further, the sequences of events described in FIGS. 1-21 are exemplary and not intended to be limiting. Thus, other process stages may be used, and even with the processes depicted in FIGS. 1-21, the particular order of events may vary without departing from the scope of the present invention. Moreover, certain process stages may not be present and additional stages may be implemented in FIGS. 1-21. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of identifying baselines for relationships, comprising:
   obtaining, at a computer, a first set of relationships between information atoms, wherein at least one of the information atoms comprises a descriptor of an individual;
   identifying baselines for the first set of relationships;
   obtaining a second set of relationships between the information atoms;
   determining a set of differences between the baselines and the relationships in the second set of relationships;
   identifying a third set of relationships between the set of differences and the descriptor; and
   associating the differences with the descriptor, based on the third set of relationships.

2. The method of claim 1, wherein the baselines comprise first baselines and the set of differences comprise comprises a first set of differences, the method comprising:
   identifying a first set of sentiments for the first set of relationships;
   identifying second baselines for the first set of sentiments;
   identifying a second set of sentiments for the second set of relationships; and
   determining a second set of differences between the second baselines and the second set of sentiments.

3. The method of claim 2, wherein the information atoms further comprise statements made by an individual, or topics to which the statements pertain.

4. The method of claim 2, wherein the information atoms comprise a first set of information atoms, the method comprising:
   predicting a second set of information atoms related to the descriptor, based on the differences and third set of relationships; and
   outputting an information atom from the second set of information atoms.

5. The method of claim 4, wherein the set of differences comprises a first set of differences, the method comprising:
   obtaining a third set of information atoms;
   computing a fourth set of relationships between the second and third sets of information atoms;
   predicting a second set of differences related to the descriptor, based on the third and fourth sets of relationships; and
   outputting a difference from the second set of differences.

6. The method of claim 5, comprising:
   computing a fifth set of relationships between the first set of differences and the second set of differences;
   predicting a fourth set of information atoms related to the descriptor, based on the fifth set of relationships; and
   outputting an information atom from the fourth set of information atoms.

7. The method of claim 5, wherein outputting a difference from the second set of differences comprises:
   identifying a third set of sentiments, based on the second set of differences; and
   outputting a sentiment from the third set of sentiments.

8. The method of claim 5, wherein the descriptor comprises a first descriptor, and the information atoms further comprise a group of one or more second descriptors, the method further comprising:
   obtaining fifth relationships between the first descriptor and the group of second descriptors; and
   wherein predicting a second set of differences comprises predicting a second set of differences for the first descriptor, based on the fifth set of relationships and the third and fourth sets of relationships associated with the group of second descriptors.

9. The method of claim 1, comprising:
   storing the baselines;
   recognizing a pattern in the differences; and
   identifying a new baseline based on the pattern.

10. The method of claim 1, wherein at least one of the information atoms comprises a metric, the method comprising;
   determining a fourth set of relationships between the metric and information atoms other than the metric;
   identifying the differences related to the metric and the descriptor, based on the fourth set of relationships;
   determining a result based on the identified differences related to the metric; and
   outputting the result.

11. The method of claim 1, comprising;
   calculating a score for the descriptor, based on the differences and the third set of relationships; and
   outputting the score.

12. The method of claim 1, comprising;
   outputting one or more of the differences associated with the descriptor, based on the third set of relationships.

13. The method of claim 1, wherein at least one relationship in the first, second or third set of relationships comprises a magnitude.

14. The method of claim 1, wherein at least one relationship in the first, second, or third set of relationships comprises a direction.

15. The method of claim 1, comprising:
   recognizing a pattern in the differences; and
   adjusting a relationship in the second set of relationships based on the pattern and the baselines.

16. The method of claim 1, comprising:
   recognizing a pattern in the differences; and
   adjusting an information atom based on the pattern and the baselines.

17. A non-transitory computer-readable storage medium encoded with instructions that, when executed on a processor, perform a method of identifying baselines for relationships, the method comprising:
   obtaining, at a computer, a first set of relationships between information atoms, wherein at least one of the information atoms comprises a descriptor of an individual;
   identifying baselines for the first set of relationships;
   obtaining a second set of relationships between the information atoms;
   determining a set of differences between the baselines and the relationships in the second set of relationships;
   identifying a third set of relationships between the set differences and the descriptor; and
   associating the differences with the descriptor, based on the third set of relationships.

18. The storage medium of claim 17, wherein the baselines comprise first baselines and the set of differences comprises a first set of differences, the method comprising:
   identifying a first set of sentiments for the first set of relationships;
   identifying second baselines for the first set of sentiments;
   identifying a second se sentiments for the second set of relationships; and
   determining a second set of differences between the second baselines and the second set of sentiments.

19. The storage medium of claim 17, wherein the method comprises:
   storing the baselines;
   recognizing a pattern in the differences; and
   identifying a new baseline based on the pattern.

20. The storage medium of claim 17, wherein at least one of the information atoms comprises a metric, the method comprising:
   determining a fourth set of relationships between the metric and information atoms other than the metric;
   identifying the differences related to metric and the descriptor, based on the fourth set of relationships;
   determining a result based on the identified differences related to the metric; and
   outputting the result.

21. The storage medium of claim 17, wherein the wherein the method comprises:
   recognizing a pattern in the differences; and
   adjusting a relationship in the second set of relationships based on the pattern and the baselines.

22. The storage medium of claim 17, wherein the method comprises:
   recognizing a pattern in the differences; and
   adjusting an information atom based on the pattern and the baselines.

23. A characteristic-based server comprising:
   a processor; and
   memory containing instructions executed by the processor to perform a method comprising;
      obtaining, at a computer, a first set of relationships between information atoms, wherein at least one of the information atoms comprises a descriptor of an individual;

identifying baselines for the first set of relationships;

obtaining a second set of relationships between the information atoms;

determining a set of differences between the baselines and the relationships in the second set of relationships;

identifying a third set of relationships between the set of differences and the descriptor; and associating the differences with the descriptor, based on the third set of relationships.

24. The server of claim 23, wherein the baselines comprise first baselines, the set of differences comprises a first set of differences, and the memory contains instructions executed by the processor to perform a method further comprising:

identifying a first set of sentiments for the first set of relationships;

identifying second baselines for the first set of sentiments;

identifying a second set of sentiments for the second set of relationships; and determining a second set of differences between the second baselines and the second set of sentiments.

25. The server of claim 23, the memory containing instructions executed by the processor to perform a method further comprising:

storing the baselines;

recognizing a pattern in the differences; and identifying a new based on the pattern.

26. The server of claim 23, wherein at least one information atom comprises a metric, and the memory contains instructions executed by the processor to perform a method further comprising:

determining a fourth set of relationships between the metric and information atoms other than the metric;

identifying the differences related to the metric and the descriptor, based on the fourth set of relationships;

determining a result based on the identified differences related to the metric; and outputting the result.

27. The server of claim 23, wherein the memory further comprises instructions operable to:

calculate a score for the descriptor, based on the differences and the third set of relationships; and output the score for the descriptor.

28. The server of claim 23, wherein the memory further comprises instructions operable to output a difference for the descriptor, based on the third set of relationships.

29. The system of claim 23, wherein the memory further comprises instructions operable to:

recognize a pattern in the differences; and adjust a relationship in the second set of relationships based on the pattern and the baselines.

30. The system of claim 23, wherein the memory further comprises instructions operable to:

recognize a pattern in the differences; and adjust an information atom based on the pattern and the baselines.

\* \* \* \* \*

UNITED STATES PATENT AND TRADEMARK OFFICE
CERTIFICATE OF CORRECTION

PATENT NO. : 8,478,702 B1
APPLICATION NO. : 13/621717
DATED : July 2, 2013
INVENTOR(S) : Adam Treiser It is certified that error appears in the above-identified patent and that said Letters Patent is hereby corrected as shown below:

In the Claims

Claim 18, Col. 20, Line 31, "second se sentiments" should read --second set of sentiments--.

Signed and Sealed this
Third Day of December, 2013

Margaret A. Focarino
*Commissioner for Patents of the United States Patent and Trademark Office*